(12) United States Patent
Eirinberg et al.

(10) Patent No.: US 11,809,633 B2
(45) Date of Patent: Nov. 7, 2023

(54) MIRRORING DEVICE WITH POINTING BASED NAVIGATION

(71) Applicant: Snap Inc., Santa Monica, CA (US)

(72) Inventors: Dylan Shane Eirinberg, Venice, CA (US); Kyle Goodrich, Venice, CA (US); Andrew James McPhee, Culver City, CA (US); Daniel Moreno, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 157 days.

(21) Appl. No.: 17/249,857

(22) Filed: Mar. 16, 2021

(65) Prior Publication Data
US 2022/0300081 A1 Sep. 22, 2022

(51) Int. Cl.
*G09G 5/00* (2006.01)
*G06F 3/01* (2006.01)
*G06F 3/0482* (2013.01)
*G06T 7/20* (2017.01)
*G06F 3/04815* (2022.01)
*G06V 40/10* (2022.01)

(52) U.S. Cl.
CPC .............. *G06F 3/017* (2013.01); *G06F 3/011* (2013.01); *G06F 3/0482* (2013.01); *G06F 3/04815* (2013.01); *G06T 7/20* (2013.01); *G06V 40/107* (2022.01); *G06T 2207/10016* (2013.01); *G06T 2207/30196* (2013.01); *G06T 2207/30241* (2013.01)

(58) Field of Classification Search
CPC ........ G02B 2027/0178; G02B 27/0172; G06F 3/011; G06F 3/017; G06F 3/0304; G06Q 50/01; G06V 20/20; G06V 40/20; G06V 40/23; G06V 40/28; G09G 2320/0626; G09G 5/10; H04N 23/611; H04N 23/632; H04N 23/633; H04N 23/64
See application file for complete search history.

(56) References Cited

U.S. PATENT DOCUMENTS 5,880,731 A  3/1999  Liles et al.
6,023,270 A  2/2000  Brush, II et al.
(Continued)

FOREIGN PATENT DOCUMENTS

CN  103049761 B  8/2016
CN  109863532     6/2019
(Continued)

OTHER PUBLICATIONS

"U.S. Appl. No. 17 249,859, Non Final Office Action dated Sep. 29, 2021", 17 pgs.
(Continued)

*Primary Examiner* — Insa Sadio
(74) *Attorney, Agent, or Firm* — Schwegman Lundberg & Woessner, P.A.

(57) ABSTRACT

Systems and methods are provided for performing operations comprising: capturing, by an electronic mirroring device, a video feed received from a camera of the electronic mirroring device, the video feed depicting a user; identifying a finger of a hand of the user in the video feed; determining a direction within the video feed to which the finger is pointing; and accessing a first menu option based on the direction within the video feed to which the finger is pointing.

20 Claims, 13 Drawing Sheets

(56) References Cited

U.S. PATENT DOCUMENTS

| | | |
|---|---|---|
| 6,067,085 A | 5/2000 | Modh et al. |
| 6,160,899 A | 12/2000 | Lee et al. |
| 6,191,773 B1 | 2/2001 | Maruno et al. |
| 6,223,165 B1 | 4/2001 | Lauffer |
| 6,772,195 B1 | 8/2004 | Hatlelid et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van Luchene et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 7,971,156 B2 | 6/2011 | Albertson et al. |
| 7,996,793 B2 | 8/2011 | Latta et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,487,888 B2 | 7/2013 | Wigdor et al. |
| 8,487,938 B2 | 7/2013 | Latta et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | Andres del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,723,789 B1 | 5/2014 | Rafii |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,856,691 B2 | 10/2014 | Geisner et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,982,110 B2 | 3/2015 | Saban et al. |
| 8,989,786 B2 | 3/2015 | Feghali |
| 9,086,776 B2 | 7/2015 | Ye et al. |
| 9,105,014 B2 | 8/2015 | Collet et al. |
| 9,110,502 B2 | 8/2015 | Fink |
| 9,225,897 B1 | 12/2015 | Sehn et al. |
| 9,230,160 B1 | 1/2016 | Kanter |
| 9,241,184 B2 | 1/2016 | Weerasinghe |
| 9,250,707 B2 | 2/2016 | Choi et al. |
| 9,256,860 B2 | 2/2016 | Herger et al. |
| 9,276,886 B1 | 3/2016 | Samaranayake |
| 9,298,257 B2 | 3/2016 | Hwang et al. |
| 9,314,692 B2 | 4/2016 | Konoplev et al. |
| 9,330,483 B2 | 5/2016 | Du et al. |
| 9,349,218 B2 | 5/2016 | Keating et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,705,831 B2 | 7/2017 | Spiegel |
| 9,706,040 B2 | 7/2017 | Kadirvel et al. |
| 9,742,713 B2 | 8/2017 | Spiegel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,042,418 B2 | 8/2018 | Hotelling et al. |
| 10,052,026 B1 | 8/2018 | Tran |
| 10,097,492 B2 | 10/2018 | Tsuda et al. |
| 10,102,423 B2 | 10/2018 | Shaburov et al. |
| 10,116,598 B2 | 10/2018 | Tucker et al. |
| 10,155,168 B2 | 12/2018 | Blackstock et al. |
| 10,165,261 B2 | 12/2018 | Valdivia et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,284,508 B1 | 5/2019 | Allen et al. |
| 10,295,338 B2 | 5/2019 | Abovitz et al. |
| 10,325,416 B1 | 6/2019 | Scapel et al. |
| 10,362,219 B2 | 7/2019 | Wilson et al. |
| 10,439,972 B1 | 10/2019 | Spiegel et al. |
| 10,475,225 B2 | 11/2019 | Park et al. |
| 10,504,266 B2 | 12/2019 | Blattner et al. |
| 10,509,466 B1 | 12/2019 | Miller et al. |
| 10,514,876 B2 | 12/2019 | Sehn |
| 10,573,048 B2 | 2/2020 | Ni et al. |
| 10,579,869 B1 | 3/2020 | Xiong et al. |
| 10,606,364 B2 | 3/2020 | Smith et al. |
| 10,614,855 B2 | 4/2020 | Huang |
| 10,657,701 B2 | 5/2020 | Osman et al. |
| 10,712,901 B2 | 7/2020 | Hwang et al. |
| 10,748,347 B1 | 8/2020 | Li et al. |
| 10,845,511 B2 | 11/2020 | Cao et al. |
| 10,958,608 B1 | 3/2021 | Allen et al. |
| 10,962,809 B1 | 3/2021 | Castaneda |
| 10,996,846 B2 | 5/2021 | Robertson et al. |
| 10,997,787 B2 | 5/2021 | Ge et al. |
| 11,003,307 B1 | 5/2021 | Ravasz et al. |
| 11,012,390 B1 | 5/2021 | Al Majid et al. |
| 11,030,454 B1 | 6/2021 | Xiong et al. |
| 11,036,368 B1 | 6/2021 | Al Majid et al. |
| 11,055,920 B1 | 7/2021 | Bramwell et al. |
| 11,062,498 B1 | 7/2021 | Voss et al. |
| 11,087,728 B1 | 8/2021 | Canberk et al. |
| 11,092,998 B1 | 8/2021 | Castaneda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,169,600 B1 | 11/2021 | Canberk et al. |
| 11,227,626 B1 | 1/2022 | Krishnan Gorumkonda et al. |
| 11,307,747 B2 | 4/2022 | Dancie et al. |
| 11,531,402 B1 | 12/2022 | Stolzenberg |
| 11,546,505 B2 | 1/2023 | Canberk |
| 2002/0067362 A1 | 6/2002 | Agostino Nocera et al. |
| 2002/0126161 A1 | 9/2002 | Kuzunuki et al. |
| 2002/0169644 A1 | 11/2002 | Greene |

(56) References Cited

U.S. PATENT DOCUMENTS

| | | |
|---|---|---|
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0141181 A1 | 6/2008 | Ishigaki et al. |
| 2008/0158222 A1 | 7/2008 | Li et al. |
| 2009/0012788 A1 | 1/2009 | Gilbert et al. |
| 2009/0016617 A1 | 1/2009 | Bregman-Amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0243824 A1 | 10/2009 | Peterson et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0156787 A1 | 6/2010 | Katayama |
| 2010/0162149 A1 | 6/2010 | Sheleheda et al. |
| 2010/0169185 A1 | 7/2010 | Cottingham |
| 2010/0203968 A1 | 8/2010 | Gill et al. |
| 2010/0227682 A1 | 9/2010 | Reville et al. |
| 2010/0306710 A1 | 12/2010 | Poot |
| 2011/0093780 A1 | 4/2011 | Dunn |
| 2011/0115798 A1 | 5/2011 | Nayar et al. |
| 2011/0134047 A1 | 6/2011 | Wigdor et al. |
| 2011/0148864 A1 | 6/2011 | Lee et al. |
| 2011/0239136 A1 | 9/2011 | Goldman et al. |
| 2011/0301934 A1 | 12/2011 | Tardif |
| 2012/0075168 A1 | 3/2012 | Osterhout et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2012/0179472 A1 | 7/2012 | Ryu et al. |
| 2013/0103760 A1 | 4/2013 | Golding et al. |
| 2013/0201187 A1 | 8/2013 | Tong et al. |
| 2013/0242064 A1 | 9/2013 | Herdy |
| 2013/0249948 A1 | 9/2013 | Reitan |
| 2013/0257877 A1 | 10/2013 | Davis |
| 2014/0032331 A1 | 1/2014 | Blanch et al. |
| 2014/0035913 A1 | 2/2014 | Higgins et al. |
| 2014/0043234 A1 | 2/2014 | Eilat et al. |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2014/0171036 A1 | 6/2014 | Simmons |
| 2014/0380249 A1 | 12/2014 | Fleizach |
| 2015/0029094 A1* | 1/2015 | Aronsson ............ G06F 16/9537 |
| | | 345/156 |
| 2015/0120293 A1 | 4/2015 | Wohlert et al. |
| 2015/0123890 A1 | 5/2015 | Kapur et al. |
| 2015/0193111 A1 | 7/2015 | Kauffmann et al. |
| 2015/0206349 A1 | 7/2015 | Rosenthal et al. |
| 2015/0370320 A1 | 12/2015 | Connor |
| 2016/0004320 A1 | 1/2016 | Lundberg et al. |
| 2016/0063588 A1 | 3/2016 | Gadre et al. |
| 2016/0063613 A1 | 3/2016 | Zhao et al. |
| 2016/0127710 A1 | 5/2016 | Saban et al. |
| 2016/0134840 A1 | 5/2016 | Mcculloch |
| 2016/0234149 A1 | 8/2016 | Tsuda et al. |
| 2016/0266653 A1* | 9/2016 | Liu .................. G06F 3/0304 |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0123487 A1 | 5/2017 | Hazra et al. |
| 2017/0199855 A1 | 7/2017 | Fishbeck |
| 2017/0235848 A1 | 8/2017 | Van Dusen et al. |
| 2017/0277684 A1 | 9/2017 | Dharmarajan Mary |
| 2017/0277685 A1 | 9/2017 | Takumi |
| 2017/0285345 A1 | 10/2017 | Ferens et al. |
| 2017/0287060 A1 | 10/2017 | Choi et al. |
| 2017/0310934 A1 | 10/2017 | Du et al. |
| 2017/0312634 A1 | 11/2017 | Ledoux et al. |
| 2017/0313248 A1 | 11/2017 | Kothari |
| 2017/0035191 A1 | 12/2017 | Elwazer et al. |
| 2018/0047200 A1 | 2/2018 | O'Hara et al. |
| 2018/0091732 A1 | 3/2018 | Wilson et al. |
| 2018/0113587 A1 | 4/2018 | Allen et al. |
| 2018/0115503 A1 | 4/2018 | Baldwin et al. |
| 2018/0158370 A1 | 6/2018 | Pryor |
| 2018/0292907 A1 | 10/2018 | Katz |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0098291 A1 | 3/2019 | Valdivia et al. |
| 2019/0121522 A1* | 4/2019 | Davis .................. G02B 27/017 |
| 2019/0188920 A1 | 6/2019 | Mcphee et al. |
| 2019/0251749 A1 | 8/2019 | Rhodes, Jr. et al. |
| 2019/0371028 A1 | 12/2019 | Harrises et al. |
| 2019/0384407 A1 | 12/2019 | Smith et al. |
| 2020/0104040 A1 | 4/2020 | Morris et al. |
| 2020/0151489 A1 | 5/2020 | Sriram et al. |
| 2020/0250410 A1 | 8/2020 | Hosseinkhani Loorak et al. |
| 2020/0336705 A1 | 10/2020 | Mouizina et al. |
| 2020/0387214 A1 | 12/2020 | Ravasz et al. |
| 2020/0404161 A1 | 12/2020 | Marlin et al. |
| 2021/0011612 A1 | 1/2021 | Dancie et al. |
| 2021/0026454 A1 | 1/2021 | Hong et al. |
| 2021/0055801 A1 | 2/2021 | Lee |
| 2021/0055838 A1 | 2/2021 | Schimke |
| 2021/0074016 A1 | 3/2021 | Li et al. |
| 2021/0166732 A1 | 6/2021 | Shaburova et al. |
| 2021/0174034 A1 | 6/2021 | Retek et al. |
| 2021/0241529 A1 | 8/2021 | Cowburn et al. |
| 2021/0300709 A1 | 9/2021 | Seniff |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0382564 A1 | 12/2021 | Blachly et al. |
| 2021/0397000 A1 | 12/2021 | Rodriguez, II |
| 2021/0405761 A1 | 12/2021 | Canberk |
| 2022/0072383 A1 | 3/2022 | Liao et al. |
| 2022/0084108 A1 | 3/2022 | Krishnan et al. |
| 2022/0188539 A1 | 6/2022 | Chan et al. |
| 2022/0192346 A1 | 6/2022 | Mouizina et al. |
| 2022/0206588 A1 | 6/2022 | Canberk et al. |
| 2022/0245967 A1 | 8/2022 | Choo et al. |
| 2022/0261066 A1 | 8/2022 | Dryer et al. |
| 2022/0300730 A1 | 9/2022 | Eirinberg et al. |
| 2022/0300731 A1 | 9/2022 | Eirinberg et al. |
| 2022/0300732 A1 | 9/2022 | Eirinberg et al. |
| 2022/0301231 A1 | 9/2022 | Eirinberg et al. |
| 2022/0326781 A1 | 10/2022 | Hwang et al. |
| 2022/0334649 A1 | 10/2022 | Hwang et al. |
| 2023/0065031 A1 | 3/2023 | Berger et al. |

FOREIGN PATENT DOCUMENTS

| | | |
|---|---|---|
| CN | 110168478 | 8/2019 |
| EP | 2184092 | 5/2010 |
| EP | 3707693 A1 | 9/2020 |
| JP | 2001230801 | 8/2001 |
| JP | 5497931 | 3/2014 |
| KR | 101445263 | 9/2014 |
| KR | 20220158824 A | 12/2022 |
| WO | 2003094072 | 11/2003 |
| WO | 2004095308 | 11/2004 |
| WO | 2006107182 | 10/2006 |
| WO | 2007134402 | 11/2007 |
| WO | 2012139276 | 10/2012 |
| WO | 2013027893 | 2/2013 |
| WO | 2013152454 | 10/2013 |
| WO | 2013166588 | 11/2013 |

(56) References Cited

FOREIGN PATENT DOCUMENTS

| | | |
|---|---|---|
| WO | 2014031899 | 2/2014 |
| WO | 2014194439 | 12/2014 |
| WO | 2016090605 | 6/2016 |
| WO | WO-2016168591 A1 | 10/2016 |
| WO | 2018081013 | 5/2018 |
| WO | 2018102562 | 6/2018 |
| WO | 2018129531 | 7/2018 |
| WO | 2019089613 | 5/2019 |
| WO | WO-2019094618 A1 | 5/2019 |
| WO | WO-2022005687 A1 | 1/2022 |
| WO | WO-2022005693 A1 | 1/2022 |
| WO | WO-2022060549 A2 | 3/2022 |
| WO | WO-2022066578 A1 | 3/2022 |
| WO | WO-2022132381 A1 | 6/2022 |
| WO | WO-2022146678 A1 | 7/2022 |
| WO | WO-2022198179 A1 | 9/2022 |
| WO | WO-2022198182 A1 | 9/2022 |
| WO | WO-2022216784 A1 | 10/2022 |
| WO | WO-2022225761 A1 | 10/2022 |
| WO | WO-2022245765 A1 | 11/2022 |

OTHER PUBLICATIONS

"U.S. Appl. No. 17 249,855, Non Final Office Action dated Apr. 14, 2022", 9 pgs.

"U.S. Appl. No. 17/249,848, Non Final Office Action dated Jun. 9, 2022", 13 pgs.

"International Application Serial No. PCT US2022 071089, International Search Report dated May 25, 2022", 4 pgs.

"International Application Serial No. PCT US2022 071089, Written Opinion dated May 25, 2022", 6 pgs.

"International Application Serial No. PCT US2022 071113, International Search Report dated May 24, 2022", 5 pgs.

"International Application Serial No. PCT US2022 071113, Written Opinion dated May 24, 2022", 10 pgs.

"U.S. Appl. No. 17/249,859, Response filed Dec. 20, 2021 to Non Final Office Action dated Sep. 29, 2021", 10 pgs.

"U.S. Appl. No. 17/249,859, Final Office Action dated Jan. 27, 2022", 19 pgs.

"Virtual fitting technology being trailled by ASOS, Macys and Walmart", Retrieved from the internet: https: www.retail-innovation.com virtual-fitting-room-technology-trialled-by-asos-macys-walmart, (Jun. 27, 2020), 6 pgs.

"U.S. Appl. No. 17/249,859, Response filed Mar. 4, 22 to Final Office Action dated Jan. 27, 2022", 10 pgs.

"U.S. Appl. No. 17/249,859, Advisory Action dated Mar. 21, 2022", 3 pgs.

"U.S. Appl. No. 17/249,845, Non Final Office Action dated Nov. 23, 2022", 15 pgs.

"U.S. Appl. No. 17/249,845, Notice of Allowance dated Mar. 9, 2023", 10 pgs.

"U.S. Appl. No. 17/249,845, Response filed Jan. 31, 2023 to Non Final Office Action dated Nov. 23, 2022", 9 pgs.

"U.S. Appl. No. 17/249,848, Advisory Action dated Jan. 5, 2023", 4 pgs.

"U.S. Appl. No. 17/249,848, Final Office Action dated Nov. 2, 2022", 15 pgs.

"U.S. Appl. No. 17/249,848, Response filed Sep. 8, 2022 to Non Final Office Action dated Jun. 9, 2022", 8 pgs.

"U.S. Appl. No. 17/249,848, Response filed Dec. 13, 2022 to Final Office Action dated Nov. 2, 2022", 9 pgs.

"U.S. Appl. No. 17/249,855, Final Office Action dated Oct. 27, 2022", 11 pgs.

"U.S. Appl. No. 17/249,855, Notice of Allowance dated Feb. 1, 2023", 12 pgs.

"U.S. Appl. No. 17/249,855, Response filed Jul. 13, 2022 to Non Final Office Action dated Apr. 14, 2022", 9 pgs.

"U.S. Appl. No. 17/249,855, Response filed Dec. 27, 2022 to Final Office Action dated Oct. 27, 2022", 9 pgs.

"U.S. Appl. No. 17/249,859, Notice of Allowance dated Aug. 15, 2022".

"U.S. Appl. No. 17/249,859, Supplemental Notice of Allowability dated Nov. 17, 2022", 2 pgs.

"U.S. Appl. No. 17/249,845, Corrected Notice of Allowability dated Apr. 5, 2023", 7 pgs.

"U.S. Appl. No. 17/249,845, Notice of Allowance dated Jun. 23, 2023", 10 pgs.

"U.S. Appl. No. 17/249,848, Corrected Notice of Allowability dated Apr. 18, 2023", 3 pgs.

"U.S. Appl. No. 17/249,848, Notice of Allowance dated Apr. 5, 2023", 7 pgs.

"U.S. Appl. No. 17/249,855, Non Final Office Action dated May 11, 2023", 11 pgs.

"U.S. Appl. No. 17/249,859, Examiner Interview Summary dated May 30, 2023", 2 pgs.

"U.S. Appl. No. 17/249,859, Non Final Office Action dated Apr. 5, 2023", 24 pgs.

"U.S. Appl. No. 17/249,859, Notice of Allowance dated Jun. 14, 2023", 5 pgs.

"U.S. Appl. No. 17/249,859, Response filed May 30, 2023 to Non Final Office Action dated Apr. 5, 2023", 10 pgs.

"Kinectfor Windows Retail Clothing Scenario Video", [Online]. Retrieved from the Internet: <https://www.youtube.com/watch?v=Mr71jrkzWq8>, (Oct. 11, 2013).

"U.S. Appl. No. 17 249,845, Corrected Notice of Allowability dated Jun. 30, 2023", 2 pgs.

* cited by examiner

MIRRORING DEVICE WITH POINTING BASED NAVIGATION

FIELD OF USE

This disclosure relates to electronic mirroring devices.

BACKGROUND

Some electronics-enabled devices include front-facing cameras. These cameras allow users to see themselves on a screen of the devices. Namely, these devices include a camera on a same side of the device as the display screen of the devices. Such front-facing cameras are usually used to capture selfies or to assist in capturing a video of a user performing some task or activity.

BRIEF DESCRIPTION OF THE DRAWINGS

Various ones of the appended drawings merely illustrate example examples of the present disclosure and should not be considered as limiting its scope.

DETAILED DESCRIPTION

Figure 1:
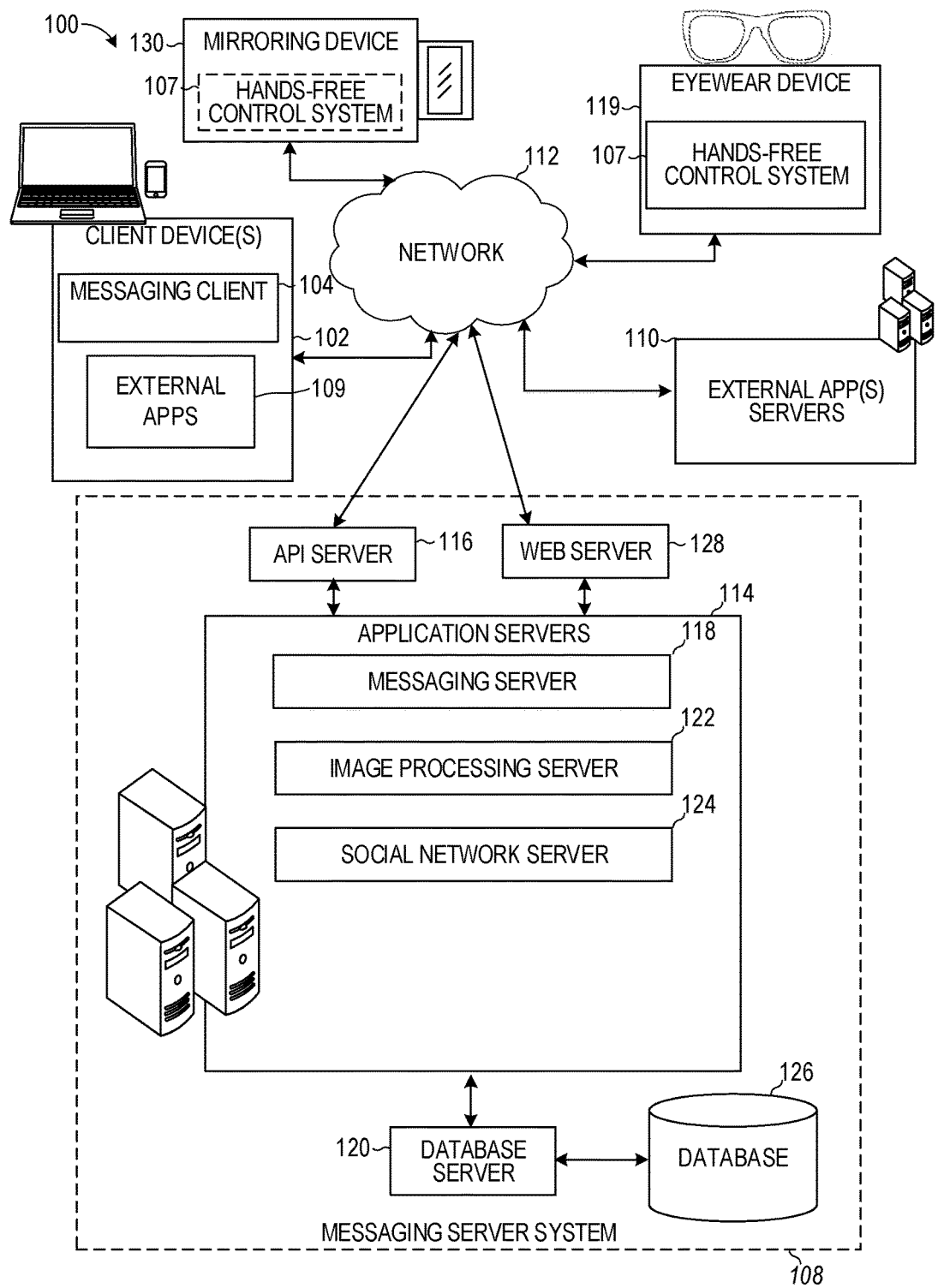
FIG. 1 is a diagrammatic representation of a networked environment in which the present disclosure may be deployed, in accordance with some examples.

The description that follows discusses illustrative examples of the disclosure. In the following description, for the purposes of explanation, numerous specific details are set forth in order to provide an understanding of various examples of the disclosed subject matter. It will be evident, however, to those skilled in the art, that examples of the disclosed subject matter may be practiced without these specific details. In general, well-known instruction instances, protocols, structures, and techniques are not necessarily shown in detail.

Typical systems allow users to create personal videos by using a front-facing camera of a mobile device. By using the front-facing camera the user can see themselves on the screen of the phone while recording a video. This ensures that the user is capturing a video of what the user intends. To do so, for example, a typical mobile phone includes a front-facing camera and the user can interact with the touchscreen of the mobile phone to select between various options to capturing a video of the user. Namely, the user can select an option on the touchscreen by making physical contact with the screen to start capturing a video clip of the user with the front-facing camera. After the user selects the option, the user has to position the mobile phone in a way that captures a full body of the user and then the user has to back away from the mobile phone. Because of this setup process involved in using the front-facing camera to create video clips, a tremendous amount of effort is required to remove and edit unwanted segments of the video clips (e.g., showing the user backing away from the mobile phone and then coming up to the phone to stop recording). Also, because the setup process requires the user to physically interact with the mobile phone to control the front-facing camera and capture video clips, a user may need to perform multiple takes and record the video clip multiple times to make various corrections to the positioning and placement of the user in the video.

The disclosed examples improve the efficiency of using the electronic device by enabling a user to remotely control an electronic mirroring device, such as a front-facing video camera of a mobile phone, using a finger (or digit) of a hand or other body part as a cursor. For example, the disclosed examples can capture, by an electronic mirroring device, a video feed received from a camera of the electronic mirroring device, the video feed depicting a user. The electronic mirroring device can identify a finger of a hand of the user in the video feed and determine a direction within the video feed to which the finger is pointing. The electronic mirroring device can access a first menu option based on the direction within the video feed to which the finger is pointing. Specifically, the user can point his or her finger in different directions to identify different options to select. As an example, if an on-screen option is displayed above the user's head, the user can point their finger up towards the option to select the option. As another example, if the on-screen option is displayed on a particular side of the screen, the user can point the finger towards that side at the on-screen option to identify and select the option.

This allows the user to remotely control the capture and modification of images and video clips by the front-facing camera without having to physically touch or interact with the electronic mirroring device. For example, the electronic mirroring device can be fixed on a camera stand so that the front-facing camera is pointing towards a target or object to be captured. After fixing the electronic mirroring device on the camera stand the user can back away and control options that are displayed on the electronic mirroring device by pointing to those options in a natural way to select the options. In this way, the capture of images and video clips using a front-facing camera is simplified and improved which reduces the number of takes a user has to perform and reduce the amount of editing needed to finalize an image or video clip. This reduces the amount of resources needed to operate a given device and improves the overall efficiency of electronic devices. This increases the efficiency, appeal, and utility of electronic devices.

In some cases, the electronic mirroring device includes a combination of an electronic eyewear device facing a static non-electronic or electronic mirror. The user can wear the electronic eyewear device to view the static mirror through lenses of the electronic eyewear device to see themselves. In this case, the electronic mirroring device includes a camera that points towards the static mirror and captures a video of the user in the mirror. The electronic eyewear device displays one or more menu options in the lenses of the electronic eyewear device at a position in relation to the user in the mirror. This makes it appear to the user as if the menu options are being displayed on the mirror above, below or next to the user. The user can point their finger at a desired option to select between the menu options to control capture of a reflection of the user in the mirror as an image or video clip by the camera of the eyewear device.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications 109 using Applications Program Interfaces (APIs). The messaging system 100 includes an eyewear device 119, which hosts a hands-free control system 107, among other applications. The eyewear device 119 is communicatively coupled to the client device 102 via the network 112 (which may include via a dedicated short-range communication path, such as a Bluetooth™ or WiFi direct connection). The messaging system 100 includes an electronic mirroring device 130, which may host another instance of the hands-free control system 107, among other applications. The electronic mirroring device 130 can include similar functionality as the client devices 102.

The hands-free control system 107 allows a user to navigate through and select between various menu options that are displayed on a screen of the eyewear device 119 or the mirroring device 130 by pointing the user's finger towards the direction of the desired menu option. For example, the hands-free control system 107 can receive or capture a video feed from a camera of the eyewear device 119 or the mirroring device 130. Specifically, the hands-free control system 107 can receive or capture a video feed from a front-facing camera of the mirroring device 130, such as the front-facing camera of a mobile phone. In another implementation, the hands-free control system 107 can receive or capture a video feed from a camera of the eyewear device 119 that is pointing towards a static mirror. The static mirror reflects an image of the user which is captured as a video feed by the camera of the eyewear device 119.

The hands-free control system 107 displays one or more menu options on the display of the mirroring device 130 or within lenses of the eyewear device 119. The hands-free control system 107 detects one or more fingers of a hand (or other body part) of the user in the video feed, such as using an object recognition process. Once the one or more fingers of the hand of the user are detected, the hands-free control system 107 determines the direction to which the one or more fingers are pointing. For example, the hands-free control system 107 draws or generates a virtual line that extends or runs along the one or more fingers parallel to the one or more fingers. In some cases, the hands-free control system 107 displays the virtual lines that are drawn on a display to help the user navigate through the options. The hands-free control system 107 determines whether a display position of at least a portion of a given menu option of the one or more menu options is intersected by the virtual line. In response to determining that the virtual line intersects the display position of at least the portion of the given menu option, the hands-free control system 107 activates, accesses or generates an indication relating to the given menu option. For example, the hands-free control system 107 increases a size of an icon corresponding to the given menu option relative to icon sizes of other menu options to indicate that the given menu option has been identified based on the direction to which the one or more fingers are pointing.

As the direction of the one or more fingers changes, the direction of virtual line also changes and is updated to remain parallel to the one or more fingers. In response to determining that the virtual line intersects a display position of a second menu option instead of the first menu option, the hands-free control system 107 animates the icon corresponding to the first menu option to reduce the size of the icon and animates a second icon corresponding to the second menu option to increase the size of the second icon. This indicates to the user that the direction of the finger has been identified as corresponding to the second menu option. The hands-free control system 107 determines that the identified menu option remains identified by the one or more fingers (e.g., the hands-free control system 107 determines that the one or more fingers remain pointed at and in a direction that a virtual line continues to intersect the display position of the identified menu option) for a threshold period of time (e.g., 3 seconds or more). In response, the hands-free control system 107 activates a function corresponding to the identified menu option (e.g., plays/pauses playback of music or video, activates a video clip capture function, overlays one or more filters on the video feed, captures an image, activates one or more augmented reality experiences or elements).

In some implementations, the hands-free control system 107 determines that the one or more fingers continued to point in the direction that corresponds to the position of the given menu option for the entire duration of a timer. For example, the hands-free control system 107 determines that the one or more fingers continued pointing towards the position of the given menu option from the time at which the icon of the given menu option was increased in size to the time at which a timer reaches a threshold time value (e.g., 3 seconds). In response, the hands-free control system 107 activates a function or performs an operation associated with the given menu option.

In an example, the given menu option is a video clip capture duration option. In such cases, the operation associated with the given menu option includes the display of another or second menu option for performing an adjustment associated with the given menu option. For example, the second menu option that is displayed may allow the user to set the video clip time duration. The video clip time duration specifies the duration of the video that is captured after the video clip capture option is selected. For example, if the video clip time duration is 5 seconds, a 5 second video clip is captured and generated from the video feed received from the front-facing camera.

In another example, the given menu option is a video modification, augmented reality selection, or image filter option. In such cases, the operation associated with the given menu option includes the display of another or second menu option for performing an adjustment associated with the given menu option. For example, the second menu option that is displayed may allow the user to select between various types of video modifications (e.g., contrast, brightness, color scheme, and so forth), augmented reality options (e.g., selecting between different types of augmented reality elements that are displayed during capture of a video clip), or different types of image filters (e.g., daytime filter, nighttime filter, and so forth).

In an example, when the second menu option is displayed, the hands-free control system 107 determines that the direction to which the one or more fingers of the hand are pointing at which the second menu option is displayed. In response to determining that the direction of the fingers of the hand in the video feed are pointing towards the second menu option, the hands-free control system 107 enables the user to perform an adjustment using the second menu option. For example, the second menu option may include a horizontal slider. When the hands-free control system 107 determines that the fingers are pointing towards the position of the horizontal slider and are moved towards a particular direction (e.g., moved to the right), the hands-free control system 107 moves the slider along the particular direction to increase or decrease the video clip duration setting or select between various video modification types, augmented reality options, or image filters.

In some cases, the hands-free control system 107 determines that the one or more fingers of the hand of the user have been moved away from pointing towards the given menu option before the timer reaches its specified value (e.g., before the timer expires). In response, the hands-free control system 107 prevents the selection or operation associated with the given menu option from being performed.

In some implementations, the hands-free control system 107 controls a three-dimensional position of an on-screen cursor based on a direction to which the user's finger is pointing. For example, the hands-free control system 107 can perform ray casting to determine and track x and y coordinates of a user's finger in a video stream. The hands-free control system 107 can display a cursor on a screen and move the cursor around as the x and y coordinates of the user's finger change in the video stream. When the cursor is displayed over a given menu option (e.g., for a specified period of time or immediately), the hands-free control system 107 performs a function or selection of the particular menu option.

In some implementations, the hands-free control system 107 can communicate with an on-board camera of the eyewear device 119 to determine or detect presence of the one or more fingers of a user's hand within view of the lenses of the eyewear device 119. For example, the camera may continuously or periodically scan real-world objects that are included in one or more images or a real-time video feed of the camera. The hands-free control system 107 may determine whether the real-world objects correspond to fingers of a human hand. In response to determining that the real-world objects correspond to a human hand, the hands-free control system 107 may determine that a user's hand has been detected within view of the lenses of the eyewear device 119. For example, the camera of the eyewear device 119 can point towards a static mirror and can display the one or more menu options within lenses of the eyewear device 119 positioned within the static mirror. The static mirror can reflect an image of the user wearing the eyewear device 119. The camera of the eyewear device 119 can capture the reflection from the static mirror and process the reflection to detect the one or more fingers of the hand of the user. The hands-free control system 107 can then determine and track the position of the one or more fingers of the hand of the user and determine the direction to which the one or more fingers are pointing. In such cases, the hands-free control system 107 activates menu options when the direction of the one or more fingers of the hand position are pointing to the positions of different ones of the menu options.

In some implementations, the electronic mirroring device can be fixed on a camera stand so that the front-facing camera is pointing towards a target or object to be captured. The hands-free control system 107 can be integrated and run on the electronic mirroring device After fixing the electronic mirroring device on the camera stand, the user can back away and control options that are displayed on the electronic mirroring device by making various hand movements. The hands-free control system 107 can track the movement of the fingers of the hands in the images captured by the front-facing camera and navigate to and select various displayed options.

In some implementations, the hands-free control system 107 modifies different portions of a video feed or activates different functions or menu options based on determining that a direction to which the one or more fingers are pointing intersect a corresponding bounding region of the video feed. Specifically, the hands-free control system 107 can generate various virtual bounding regions (e.g., virtual bounding boxes). For example, the hands-free control system 107 can generate a first virtual bounding box that corresponds to an upper left region of the video stream, a second virtual bounding box that corresponds to an upper right region of the video stream, a third virtual bounding box that corresponds to an lower left region of the video stream, and a fourth virtual bounding box that corresponds to an lower right region of the video stream. The virtual bounding regions/boxes can be of the same size or of different sizes. The hands-free control system 107 can detect one or more fingers within the video stream and determine direction to which the one or more fingers are pointing. For example, the hands-free control system 107 can generate a virtual line that extends from the one or more fingers and runs parallel to the one or more fingers. The hands-free control system 107 determines that the virtual line intersects one or more borders of a particular bounding region. In response, the hands-free control system 107 activates a function associated with the bounding region.

For example, the hands-free control system 107 can determine that the virtual line extending from the one or more fingers intersects one or more or a threshold number (e.g., two or more) segments of the first virtual bounding box. In response, the hands-free control system 107 activates a function corresponding to the first virtual bounding box. In one example, the function may include applying a filter to only the portion of the video stream enclosed by the first virtual bounding box (e.g., the upper left region of the video stream). In such cases, the hands-free control system 107 instructs the electronic mirroring device to apply the filter (e.g., a red filter) to the upper left region of the video stream and prevent application of the filter to remaining portions of the video stream. The hands-free control system 107 can determine that the one or more fingers have been moved to point in a different direction. The hands-free control system 107 updates the virtual line and determines that the virtual line corresponding to the different direction intersects one or more or the threshold number of segments of the second virtual bounding box (e.g., intersects a corner of the virtual bounding box). In response, the hands-free control system 107 activates a function corresponding to the second virtual bounding box. In one example, the function may include applying the filter (e.g., the red filter) to only the portion of the video stream enclosed by the second virtual bounding box (e.g., the upper right region of the video stream). In such cases, the hands-free control system 107 instructs the electronic mirroring device to transition the filter that was applied to the upper left region of the video stream to being applied only to the upper right region of the video stream and prevent application of the filter to remaining portions of the video stream.

In another example, the functions corresponding to the different portions of the video stream can include playback, image capture or augmented reality functions. Specifically, the hands-free control system 107 can determine that the virtual line extending from the one or more fingers intersects one or more or a threshold number (e.g., two or more) segments of the third virtual bounding box. In response, the hands-free control system 107 activates a function corresponding to the third virtual bounding box, such as capturing a video clip of a specified duration (e.g., 5 seconds) or pausing playback of an audio track or video. The hands-free control system 107 can determine that the one or more fingers have been moved to point in a different direction. The hands-free control system 107 updates the virtual line and determines that the virtual line corresponding to the different direction intersects one or more or the threshold number of segments of the fourth virtual bounding box. In response, the hands-free control system 107 activates another function corresponding to the fourth virtual bounding box, such as activating an augmented reality experience or selecting one or more augmented reality elements, or accessing a communication interface (e.g., answering a phone call, placing a phone call or responding to a message).

In some implementations, the hands-free control system 107 can determine that the direction of the one or more fingers has been changed or moved by a threshold amount (e.g., more than 90 degrees). As an example, the hands-free control system 107 can determine that the one or more fingers have been moved from pointing vertically up to pointing horizontally to the side. In response, the hands-free control system 107 scrolls through a menu of options from a first option to a second option. Specifically, the electronic mirroring device can currently have a function corresponding to a first menu option activated (e.g., a first filter or augmented reality experience is presently displayed). In response to determining that the one or more fingers have been moved from pointing vertically up to pointing horizontally to a first side (e.g., a right side of the display), the hands-free control system 107 scrolls the menu of options to the next adjacent menu option (e.g., to access a function corresponding to a second menu option). In such cases, the electronic mirroring device activates the function corresponding to a second menu option (e.g., a second filter or augmented reality experience) and stops the function corresponding to the first menu option from being activated. As another example, in response to determining that the one or more fingers have been moved from pointing vertically up to pointing horizontally to a second side (which is opposite to the first side, such as the left side of the display), the hands-free control system 107 scrolls the menu of options to the previous adjacent menu option (e.g., to access a function corresponding to a third menu option). Namely, if the function corresponding to the first menu option is currently activated, the electronic mirroring device activates a function corresponding to a third menu option that is previous to on the left hand side relative to the first menu option (e.g., a third filter or augmented reality experience is activated) and stops the function corresponding to the first menu option from being activated.

In some implementations, the hands-free control system 107 determines that one or more fingers of the hand have been bent by a certain degree. In response, the hands-free control system 107 navigates through and scrolls partially through the set of options based on the degree by which the one or more fingers have been bent. For example, if the hands-free control system 107 determines that the fingers have been bent by a first degree (e.g., are bent by 25 degrees from pointing in a direct vertical position to pointing towards a left side), the hands-free control system 107 causes a first amount of a first menu option to be activated and a second amount of a second menu option to be activated. As the one or more fingers continue being bent by a second degree greater than the first degree (e.g., are bent by an additional 30 degrees from the direction pointing towards the left side, such that the one or more fingers are bent by 55 degrees from the initial direct vertical position to pointing towards the left side), the hands-free control system 107 causes a third amount of a first menu option to be activated and a fourth amount of a second menu option to be activated. The third amount of the first menu option may be greater than first amount of the first menu option and the fourth amount of the second menu option may be less than the second amount of the second menu option.

In some implementations, a two-dimensional or three-dimensional carousel of menu options is displayed on a screen of the electronic mirroring device. The hands-free control system 107 detects a hand within the video stream and determines that the hand has been moved in a particular direction. The hands-free control system 107 causes the carousel of menu options to rotate or turn along the particular direction that the hand is moved within the video stream. The hands-free control system 107 can then determine that the hand has been moved in an opposite direction to the particular direction. The hands-free control system 107 causes the carousel of menu options to rotate or turn along the opposite direction to the particular direction.

A messaging client 104 is able to communicate and exchange data with other messaging clients 104, the eyewear device 119, and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Image processing server 122 is used to implement scan functionality of the augmentation system 208. Scan functionality includes activating and providing one or more augmented reality experiences on a client device 102 when an image is captured by the client device 102. Specifically, the messaging client 104 on the client device 102 can be used to activate a camera. The camera displays one or more real-time images or a video to a user along with one or more icons or identifiers of one or more augmented reality experiences. The user can select a given one of the identifiers to launch the corresponding augmented reality experience. Launching the augmented reality experience includes obtaining one or more augmented reality items associated with the augmented reality experience and overlaying the augmented reality items on top of the images or video being presented.

Figure 3:
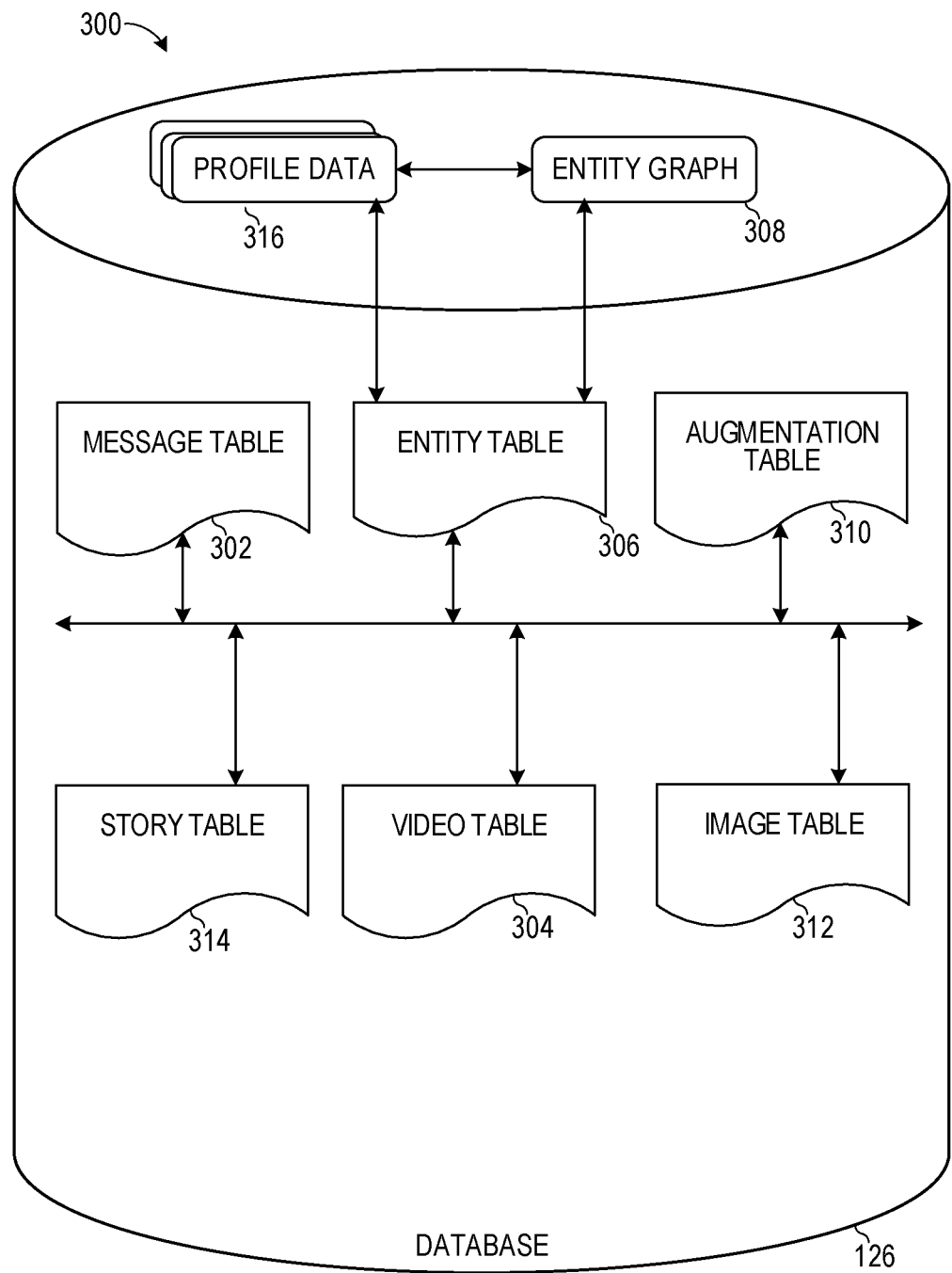
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on third-party servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from a external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

System Architecture

Figure 2:
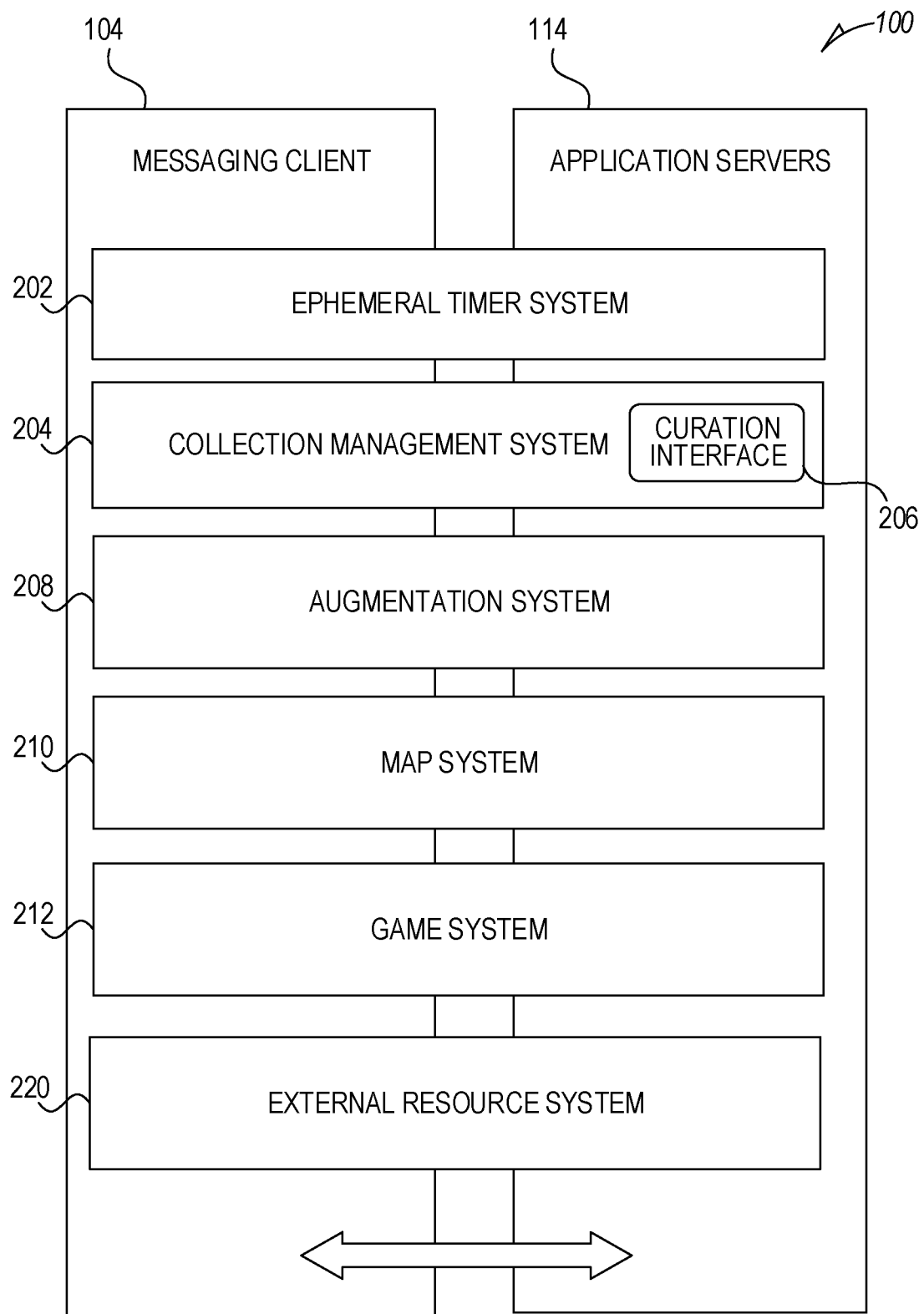
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain augmented reality experiences and presents identifiers of such experiences in one or more user interfaces (e.g., as icons over a real-time image or video or as thumbnails or icons in interfaces dedicated for presented identifiers of augmented reality experiences). Once an augmented reality experience is selected, one or more images, videos, or augmented reality graphical elements are retrieved and presented as an overlay on top of the images or video captured by the client device 102. In some cases, the camera is switched to a front-facing view (e.g., the front-facing camera of the client device 102 is activated in response to activation of a particular augmented reality experience) and the images from the front-facing camera of the client device 102 start being displayed on the client device 102 instead of the rear-facing camera of the client device 102. The one or more images, videos, or augmented reality graphical elements are retrieved and presented as an overlay on top of the images that are captured and displayed by the front-facing camera of the client device 102.

The map system 210 provides various geographic location functions, and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a Web ViewJavaScript-Bridge running on a client device 102 establishes two one-way communication channels between a external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional avatars of users with or without different avatar characteristics). As another example, external resources that include small-scale versions of external applications (e.g., web-based versions of third-party applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying augmented reality experiences). An augmented reality content item or augmented reality item may be a real-time special effect and sound that may be added to an image or a video.

As described above, augmentation data includes augmented reality content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
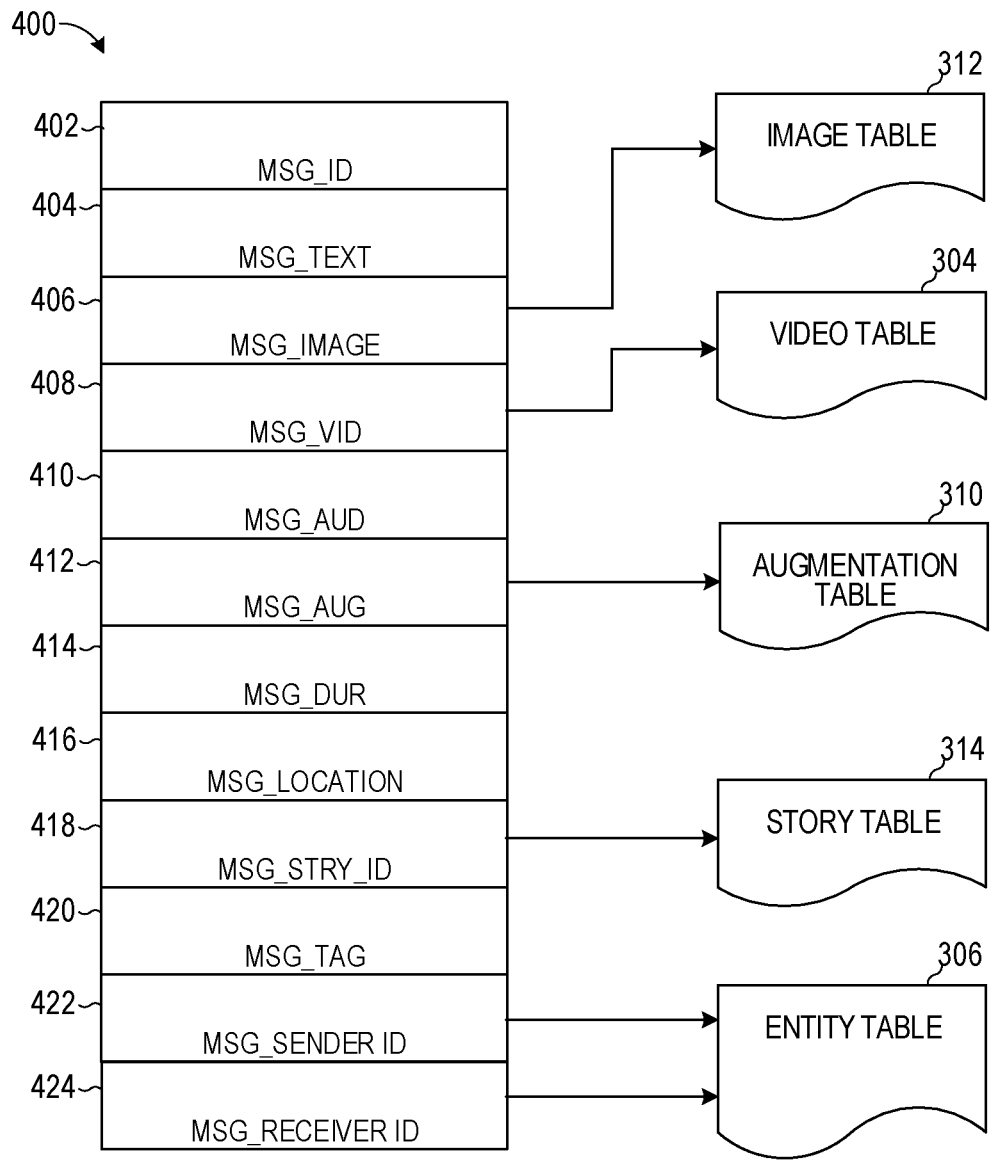
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements)

that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Eyewear Device

Figure 5:
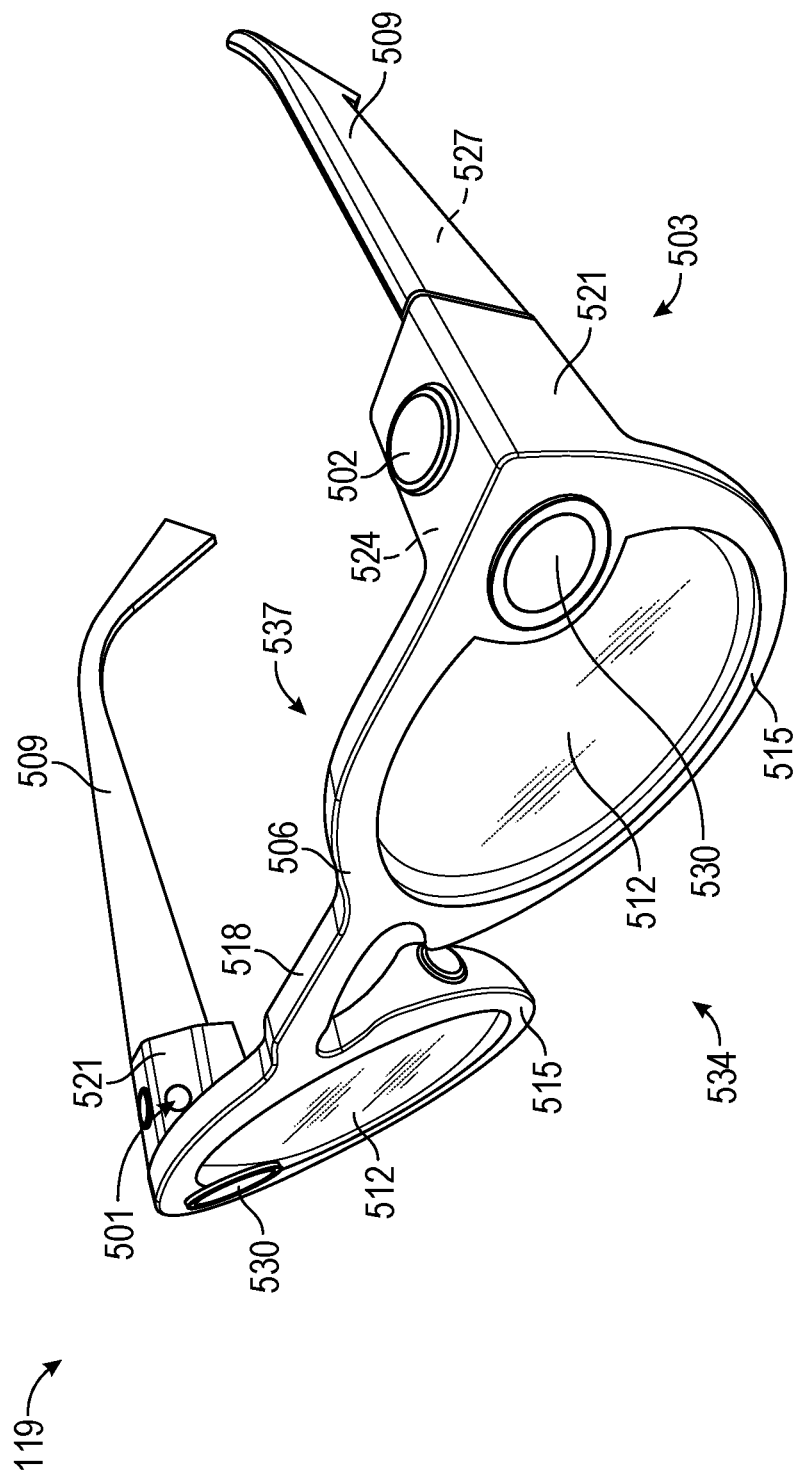
FIG. 5 is a perspective view of an eyewear device, in accordance with some examples.

FIG. 5 shows a front perspective view of an eyewear device 119 in the form of a pair of smart glasses that include a hands-free control system 107 according to one example. The eyewear device 119 includes a body 503 comprising a front piece or frame 506 and a pair of temples 509 connected to the frame 506 for supporting the frame 506 in position on a user's face when the eyewear device 119 is worn. The frame 506 can be made from any suitable material such as plastics or metal, including any suitable shape memory alloy.

The eyewear device 119 includes a pair of optical elements in the form of a pair of lenses 512 held by corresponding optical element holders in the form of a pair of rims 515 forming part of the frame 506. The rims 515 are connected by a bridge 518. In other examples, one or both of the optical elements can be a display, a display assembly, or a lens and display combination.

The frame 506 includes a pair of end pieces 521 defining lateral end portions of the frame 506. In this example, a variety of electronics components are housed in one or both of the end pieces 521. The temples 509 are coupled to the respective end pieces 521. In this example, the temples 509 are coupled to the frame 506 by respective hinges so as to be hingedly movable between a wearable mode and a collapsed mode in which the temples 509 are pivoted towards the frame 506 to lie substantially flat against it. In other examples, the temples 509 can be coupled to the frame 506 by any suitable means, or can be rigidly or fixedly secured to the frame 506 so as to be integral therewith.

Each of the temples 509 that includes a front portion of that is coupled to the frame 506 and any suitable rear portion for coupling to the ear of the user, such as the curves or cute piece illustrated in the example example of FIG. 5. In some examples, the frame 506 is formed of a single piece of material, so as to have a unitary or monolithic construction. In some examples, the whole of the body 503 (including both the frame 506 and the temples 509) can be of the unitary or monolithic construction.

The eyewear device 119 has onboard electronics components including a computing device, such as a computer 524, or low power processor, which can in different examples be of any suitable type so as to be carried by the body 503. In some examples, the computer 524 is at least partially housed in one or both of the temples 509. In the present example, various components of the computer 524 are housed in the lateral end pieces 521 of the frame 506. The computer 524 includes one or more processors with memory (e.g., a volatile storage device, such as random access memory or registers), a storage device (e.g., a non-volatile storage device), wireless communication circuitry (e.g., BLE communication devices and/or WiFi direct devices), and a power source. The computer 524 comprises low-power circuitry, high-speed circuitry, and, in some examples, a display processor. Various examples may include these elements in different configurations or integrated together in different ways.

The computer 524 additionally includes a battery 527 or other suitable portable power supply. In one example, the battery 527 is disposed in one of the temples 509. In the eyewear device 119 shown in FIG. 5, the battery 527 is shown as being disposed in one of the end pieces 521, being electrically coupled to the remainder of the computer 524 housed in the corresponding end piece 521.

The eyewear device 119 is camera-enabled, in this example comprising a camera 530 mounted in one of the end pieces 521 and facing forwards so as to be aligned more or less with the direction of view of a wearer of the eyewear device 119. The camera 530 is configured to capture digital images (also referred to herein as digital photographs or pictures) as well as digital video content. Operation of the camera 530 is controlled by a camera controller provided by the computer 524, image data representative of images or video captured by the camera 530 being temporarily stored on a memory forming part of the computer 524. In some examples, the eyewear device 119 can have a pair of cameras 530, e.g. housed by the respective end pieces 521.

As will be described in greater detail below, the onboard computer 524, camera 530, and the lenses 512 are configured together to provide a hands-free control system 107 that automatically activates a video clip capture mode in which one or more video clip generation options are displayed when a static mirror is within view of the lenses 512. The hands-free control system 107 allows the user to navigate through menu options (e.g., filters, video clip capture and share functions) by using a reflection of one or more fingers of the hand in the static mirror captured by the camera 530 as a cursor. Specifically, the lenses 512 can display virtual content or one or more virtual objects or menu options so they appear in the reflection of the user in the static mirror. This makes it appear to the user that the reflection of the user in the static mirror includes the virtual content or one or more virtual objects or menu options. The hands-free control system 107 detects a direction to which the one or more fingers of the user's hand are pointing within the reflection of the user in the static mirror and performs selections between the displayed virtual content, objects or menu options based on direction to which the one or more fingers are pointing. This gives the user the illusion that the user is interacting with an electronic mirroring device. Namely, by wearing the eyewear device 119 and focusing on a static mirror, the user is given the impression that the user is interacting with an electronic device that has a front-facing camera and is displaying a video feed on the screen facing the user.

Based on input received by the eyewear device 119 from the camera 530, the eyewear device 119 can control user interaction with the virtual content based on hand movement that appears in the reflection of the user in the static mirror in the one or more images captured by the camera 530. In one example, the user interaction can control video clip capture. For example, the eyewear device 119 can capture a video clip of the reflection of the user in the static mirror having a duration set by the options selected by the user using the hand as a cursor. In another example, the user interaction can navigate through a video modification options and video clip options. In another example, the user interaction can navigate through a conversation the user is involved in, such as by scrolling through various three-dimensional or two-dimensional conversation elements (e.g., chat bubbles) displayed in the lenses at a position of the static mirror which reflects the user and selecting individual conversation elements to respond to generate messages to transmit to participants of the conversation.

The eyewear device 119 further includes one or more communication devices, such as Bluetooth low energy (BLE) communication interface. Such BLE communication interface enables the eyewear device 119 to communicate wirelessly with the client device 102. Other forms of wireless communication can also be employed instead of, or in addition to, the BLE communication interface, such as a WiFi direct interface. The BLE communication interface implements a standard number of BLE communication protocols.

A first of the communications protocols implemented by the BLE interface of the eyewear device 119 enables an unencrypted link to be established between the eyewear device 119 and the client device 102. In this first protocol, the link-layer communication (the physical interface or medium) between the eyewear device 119 and the client device 102 includes unencrypted data. In this first protocol, the application layer (the communication layer operating on the physically exchanged data) encrypts and decrypts data that is physically exchanged in unencrypted form over the link layer of the BLE communication interface. In this way, data exchanged over the physical layer can freely be read by an eavesdropping device, but the eavesdropping device will not be able to decipher the data that is exchanged without performing a decryption operation in the application layer.

A second of the communications protocols implemented by the BLE interface of the eyewear device 119 enables an encrypted link to be established between the eyewear device 119 and the client device 102. In this second protocol, the link-layer communication (the physical interface) between the eyewear device 119 and the client device 102 receives data from the application layer and adds a first type of encryption to the data before exchanging the data over the physical medium. In this second protocol, the application layer (the communication layer operating on the physically exchanged data) may or may not use a second type of encryption to encrypt and decrypt data that is physically exchanged in encrypted form, using the first type of encryption, over the link layer of the BLE communication interface. Namely, data can be first encrypted by the application layer and then be further encrypted by the physical layer before being exchanged over the physical medium. Following the exchange over the physical medium, the data is then decrypted by the physical layer and then decrypted again (e.g., using a different type of encryption) by the application layer. In this way, data exchanged over the physical layer cannot be read by an eavesdropping device as the data is encrypted in the physical medium.

In some examples, the client device 102 communicates with the eyewear device 119 using the first protocol to exchange images or videos or virtual content between the messaging client 104 and the eyewear device 119.

Electronic Mirroring Device

Figure 6A:
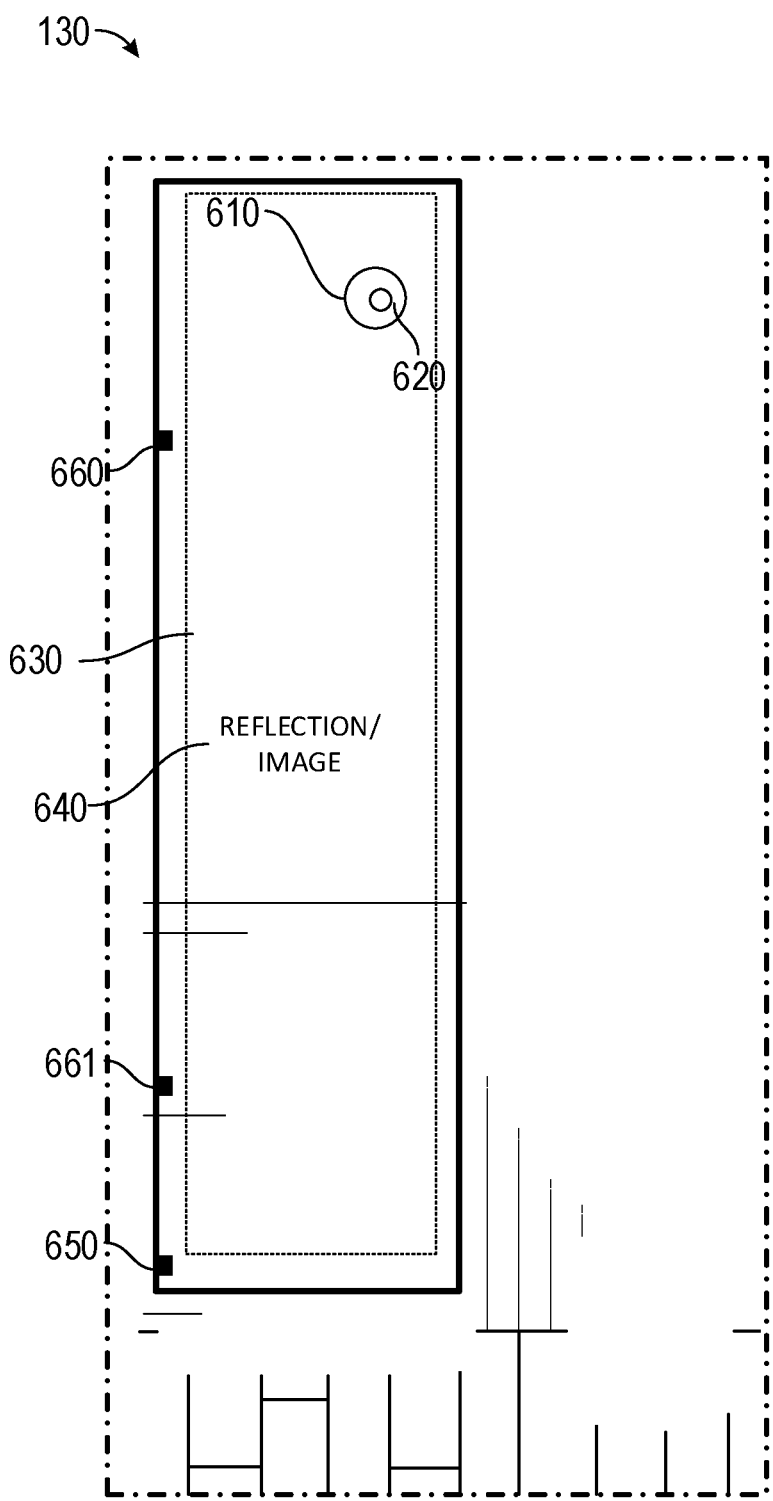
FIGS. 6A and 6B are diagrammatic representations of an electronic mirroring device, in accordance with some examples.

FIG. 6A is a diagrammatic representation of an electronic mirroring device 130 that includes a hands-free control system 107, in accordance with some examples. The electronic mirroring device 130 includes a front-facing camera 610 (e.g., a red, green and blue camera), a depth sensor 620, a mirror, screen or display 640 (e.g., 1000+ nits display), power and navigation buttons 660, a light-emitting diode (LED) light 630, a communication device 661 (e.g., WiFi or Bluetooth), and a speaker and microphone 650. When operated by the hands-free control system 107, the functions and features of the mirroring device 130 can be controlled from up to 10 or more meters away from the mirroring device 130. Namely, a user can stand 10 or more meters away from the mirroring device 130 and control and activate various features, functions and options to capture a video clip or perform other operations.

The front-facing camera 610 captures an image or video and displays the image or video that is captured on the display 640. In this way, the display 640 when viewed by a user appears to be a mirror that reflects an image of the user. Upon detecting a user by the front-facing camera 610, facial recognition techniques can be employed to provide a display on the screen of various user-specific options. As an example, the options can include video clip generation options or messaging or communication options.

The power and navigation buttons 660 can be used to turn ON/OFF the electronic mirroring device 130. When turned OFF, the display 640 no longer provides a reflection and instead is turned off and is blacked out. The electronic mirroring device 130 allows the user to interact with options presented on the display 640 using the hand of the user as a cursor or by pointing one or more fingers of the hand in different directions. Namely, the hands-free control system 107 can detect and track movement of the user's hand and fingers of the hand captured by the camera 610 and perform selections of different options that are displayed on the display 640. The user can alternatively perform selections by physically interacting with the electronic mirroring device 130 and pressing the navigation buttons 660.

The LED light 630 is a light that is placed around the border of the electronic mirroring device 130. The LED light 630 can be set to any desired color. For example, a first user can set the LED light 630 to a first color and a second user can set the LED light 630 to another color. When facial recognition of the electronic mirroring device 130 detects the first user within the view of the camera 610, the electronic mirroring device 130 activates the LED light 630 and sets the light to the first color. When facial recognition of the electronic mirroring device 130 detects the second user within the view of the camera 610 after detecting the first user, the electronic mirroring device 130 transitions the LED light 630 from the first color to the second color. The brightness of the LED light 630 can continuously transition from a first brightness setting to a second brightness setting to simulate animation of the LED light 630. In some cases, the LED light 630 can be set to a static brightness setting. When a given user is detected within view of the camera 610, the brightness of the LED light 630 can start being animated by transitioning between different brightness settings continuously.

The LED light 630 can be integrated or implemented as part of the screen of the mirroring device 130 rather than being implemented by a physical LED light. For example, a set of pixels around a border of the screen of the mirroring device 130 can be set to a specified brightness and color to mimic the function of the LED light 630. When a front-facing camera 610 is turned on and a video clip is set to be captured by the front-facing camera 610, the set of pixels around the border of the screen can be activated to illuminate the on-screen buttons and improve the quality and brightness of the video feed back captured. The LED light 630 (implemented as a border of pixels or as physical LED lights around the mirroring device 130) improves the ability of the mirroring device 130 in track a position of the user's body, hand, body parts or fingers to enable remote control of the mirroring device 130.

The communication device 661 allows the electronic mirroring device 130 to send and receive audio/video to/from other users. In one example, the electronic mirroring device 130 can capture a video clip and send the video clip to one or more other users through the communication device 661. The communication device 661 can also include cellular technology allowing a user to place phone calls to other users. The speaker and microphone 650 can receive verbal commands from the user to control the mirroring device 130 and to talk with other users. The speaker and microphone 650 can be used to capture audio while capturing video of the user to generate a video clip. The speaker and microphone 650 can be used to output audio of a video clip received by the user.

Figure 6B:
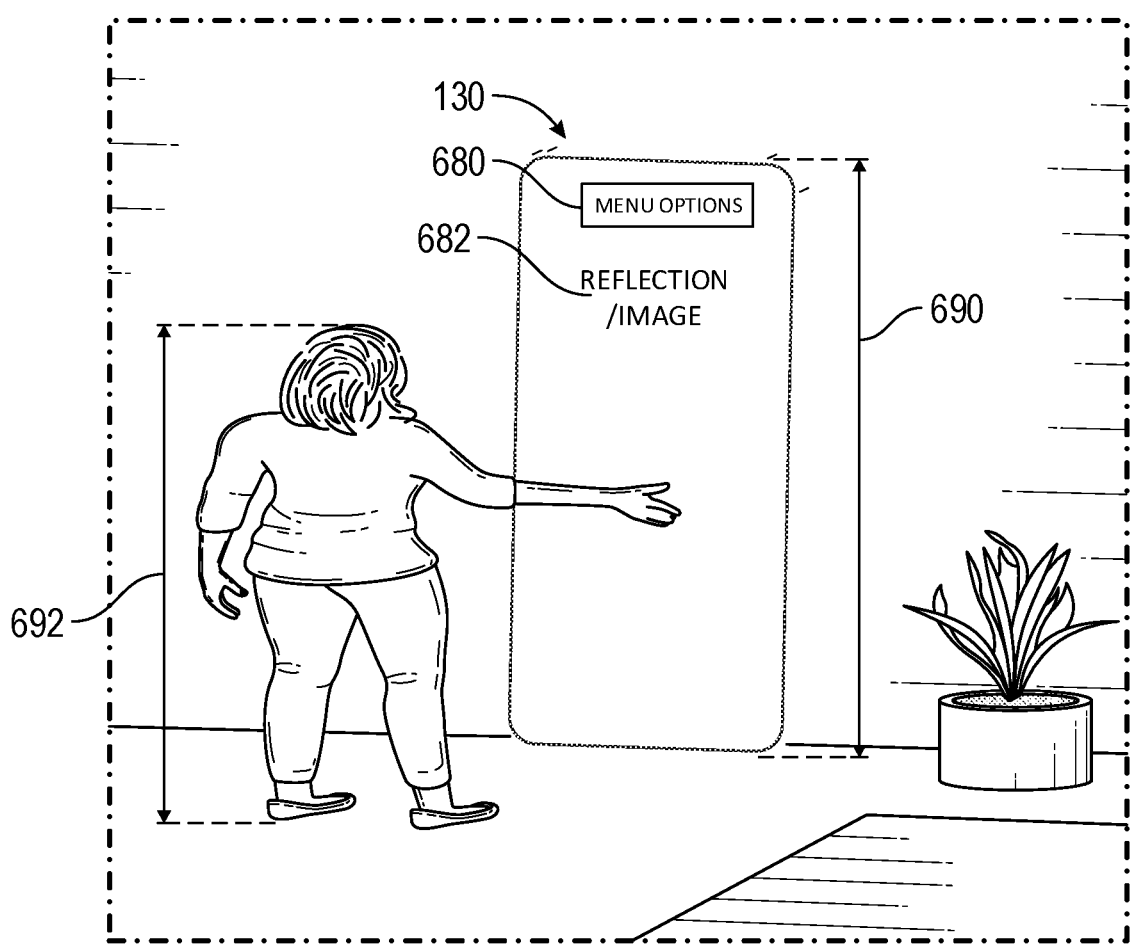

FIG. 6B is a diagrammatic representation of the electronic mirroring device 130 that includes a hands-free control system 107, in accordance with some examples. As shown, the electronic mirroring device 130 is a stationary device that stands on a floor of a household or other physical establishment. In this example, the electronic mirroring device 130 has a height 690 that is greater than a height 692 of an average user (e.g., the height is greater than 5 feet or 6 feet). It is to be understood that other sized electronic mirroring devices can be used in example embodiments. The electronic mirroring device 130 provides in the display screen 682 a reflection of the user as captured by the camera 610 of the electronic mirroring device 130. The electronic mirroring device 130 presents one or more options 680 through which the user can navigate using the user's hand as a cursor or by pointing one or more fingers of the hand in different directions, as controlled by the hands-free control system 107.

Hands-Free Control System

Figure 7:
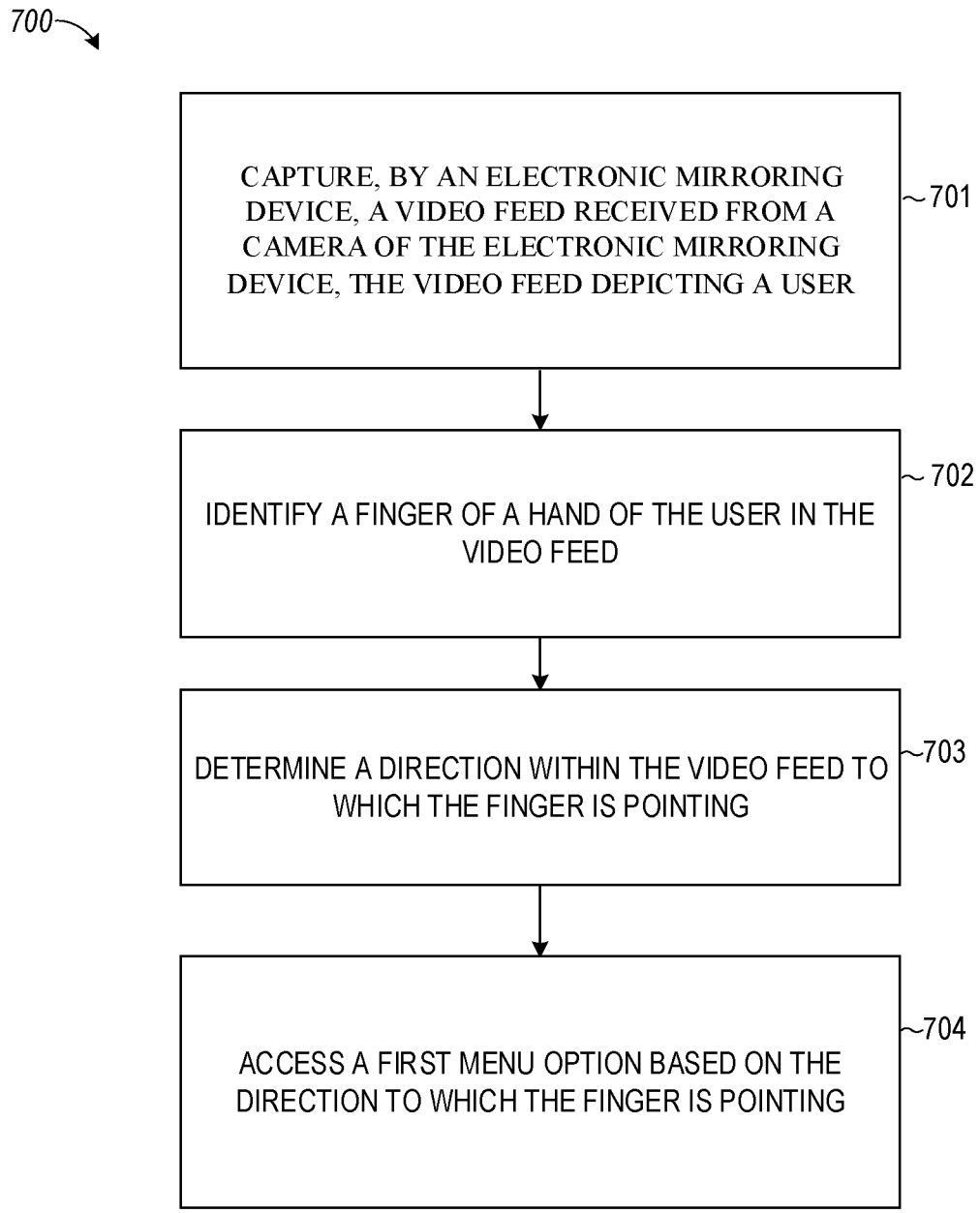
FIG. 7 is a flowchart showing example operations of the hands-free control system, in accordance with some examples.

FIG. 7 is a flowchart illustrating example operations of the hands-free control system 107 in performing a process 700, according to example examples. The process 700 may be embodied in computer-readable instructions for execution by one or more processors such that the operations of the process 700 may be performed in part or in whole by the functional components of the hands-free control system 107; accordingly, the process 700 is described below by way of example with reference thereto. However, in other examples, at least some of the operations of the process 700 may be deployed on various other hardware configurations. The process 700 is therefore not intended to be limited to the hands-free control system 107 and can be implemented in whole, or in part, by any other component. Some or all of the operations of process 700 can be in parallel, out of order, or entirely omitted.

At operation 701, the hands-free control system 107 captures a video feed received from a camera of the electronic mirroring device, the video feed depicting a user. For example, as shown in FIG. 6B, the electronic mirroring device 130 displays a video feed of the user on a screen 682 based on images captured by the front-facing camera of the electronic mirroring device 130. In some cases, the video is captured by a camera of an eyewear device 119 focused on a static mirror that reflects an image of the user.

At operation 702, the hands-free control system 107 identifies finger of a hand (or other body part) of the user in the video feed. For example, the electronic mirroring device 130 identifies the finger of the hand of the user (e.g., using one or more object recognition techniques) within the camera feed captured by the camera of the electronic mirroring device 130.

At operation 703, the hands-free control system 107 determines a direction within the video feed to which the finger is pointing. For example, the electronic mirroring device 130 determines that the finger of the hand is pointing towards a given one of the menu options 680, as explained below. In response, the electronic mirroring device 130 starts a timer that indicates when the given menu option will be activated if the user keeps their finger pointing towards the given menu option for the entire duration of the timer.

At operation 704, the hands-free control system 107 accesses a first menu option based on the direction within the video feed to which the finger is pointing. For example, the electronic mirroring device 130 determines that the finger remained pointing towards the given menu option for the duration of the timer (e.g., 3 seconds). In response, the electronic mirroring device 130 activates the corresponding function or operation of the given menu option (e.g., applies a filter, starts capturing a video clip, presents a second menu option for performing a modification or adjustment to the given menu option, adds one or more augmented reality elements, activates an augmented reality experience, and so forth).

Figure 8A:
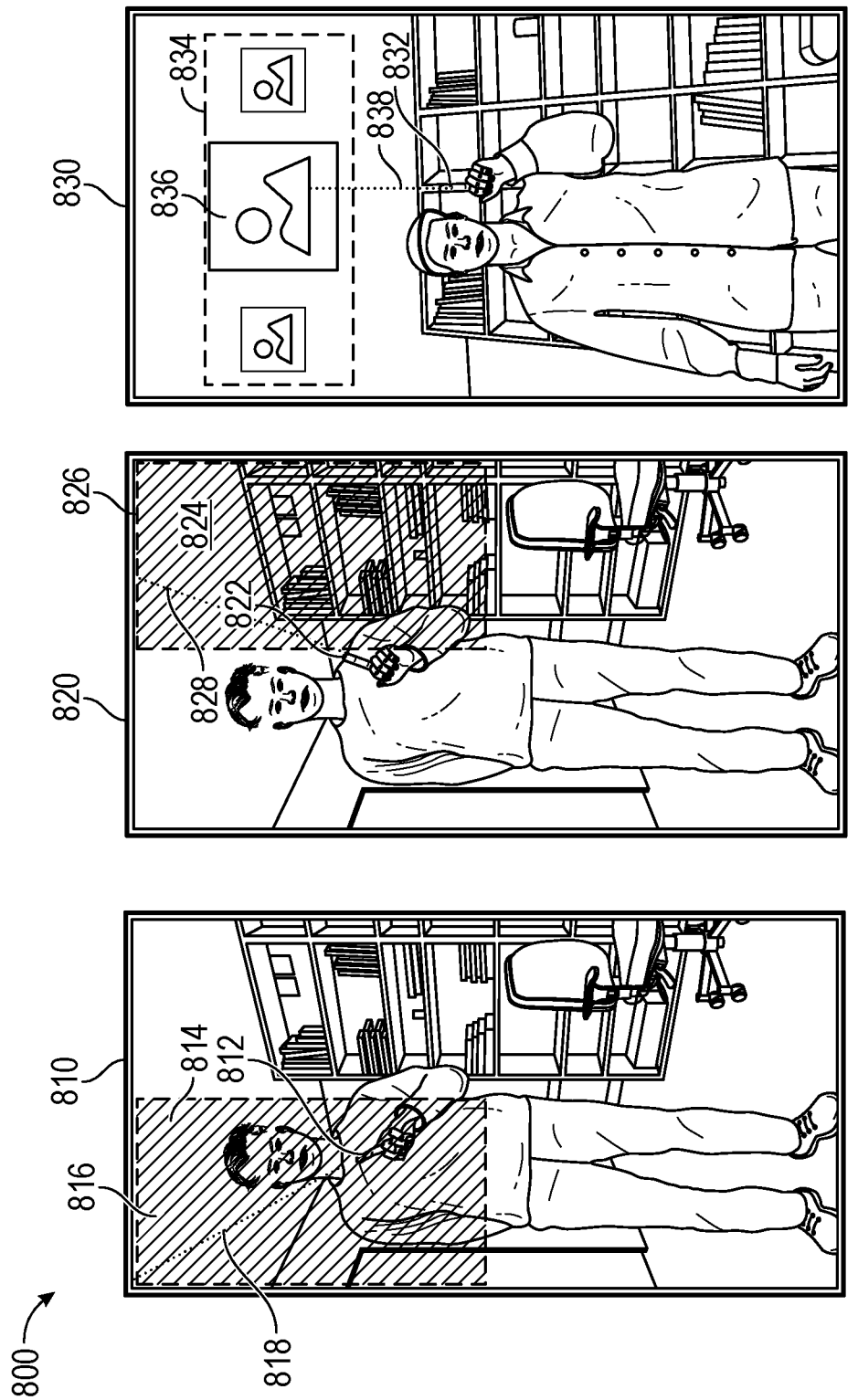
FIGS. 8A, 8B and 9 are illustrative screens of the hands-free control system, in accordance with some examples.
Figure 8B:
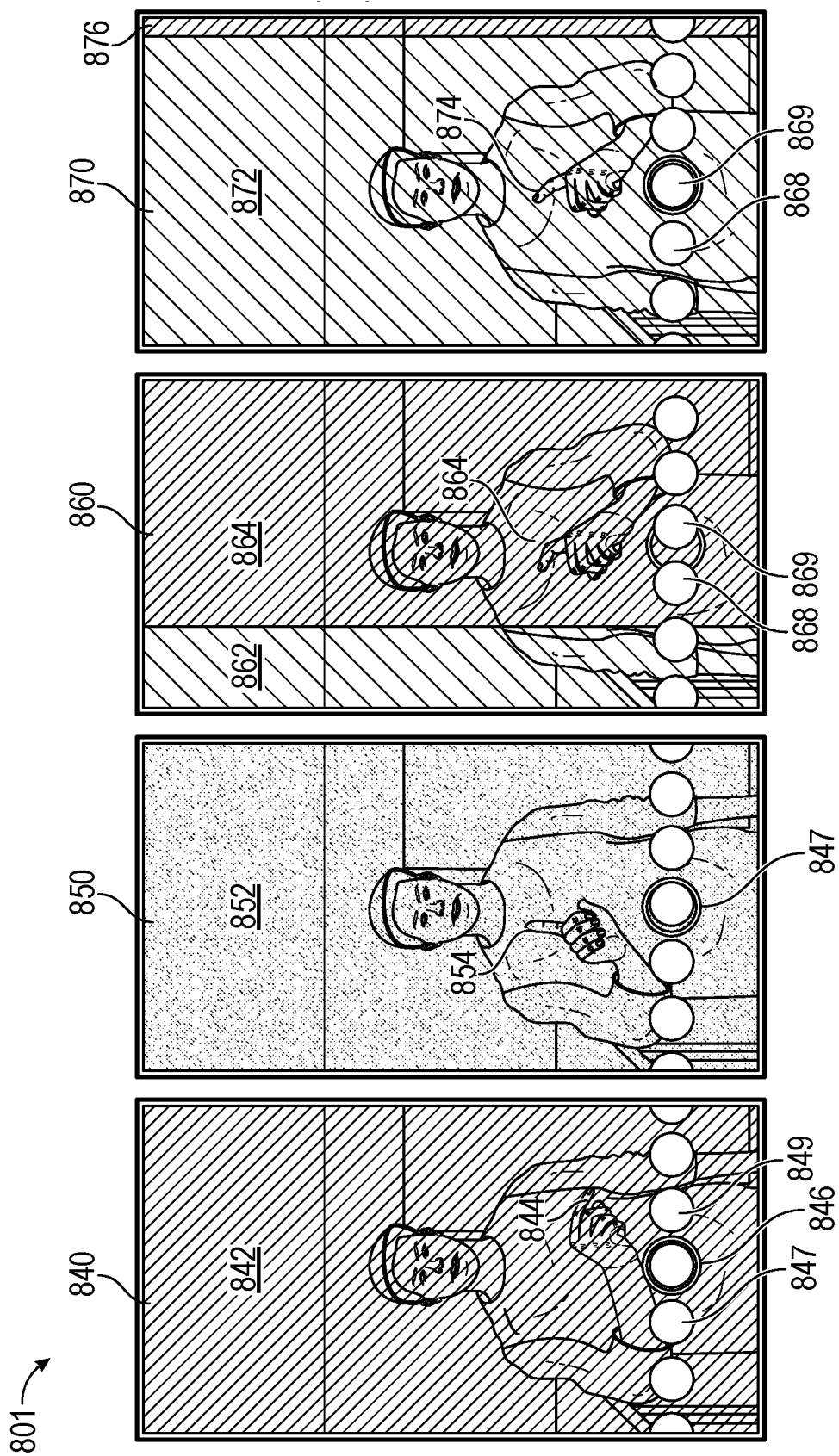
Figure 9:
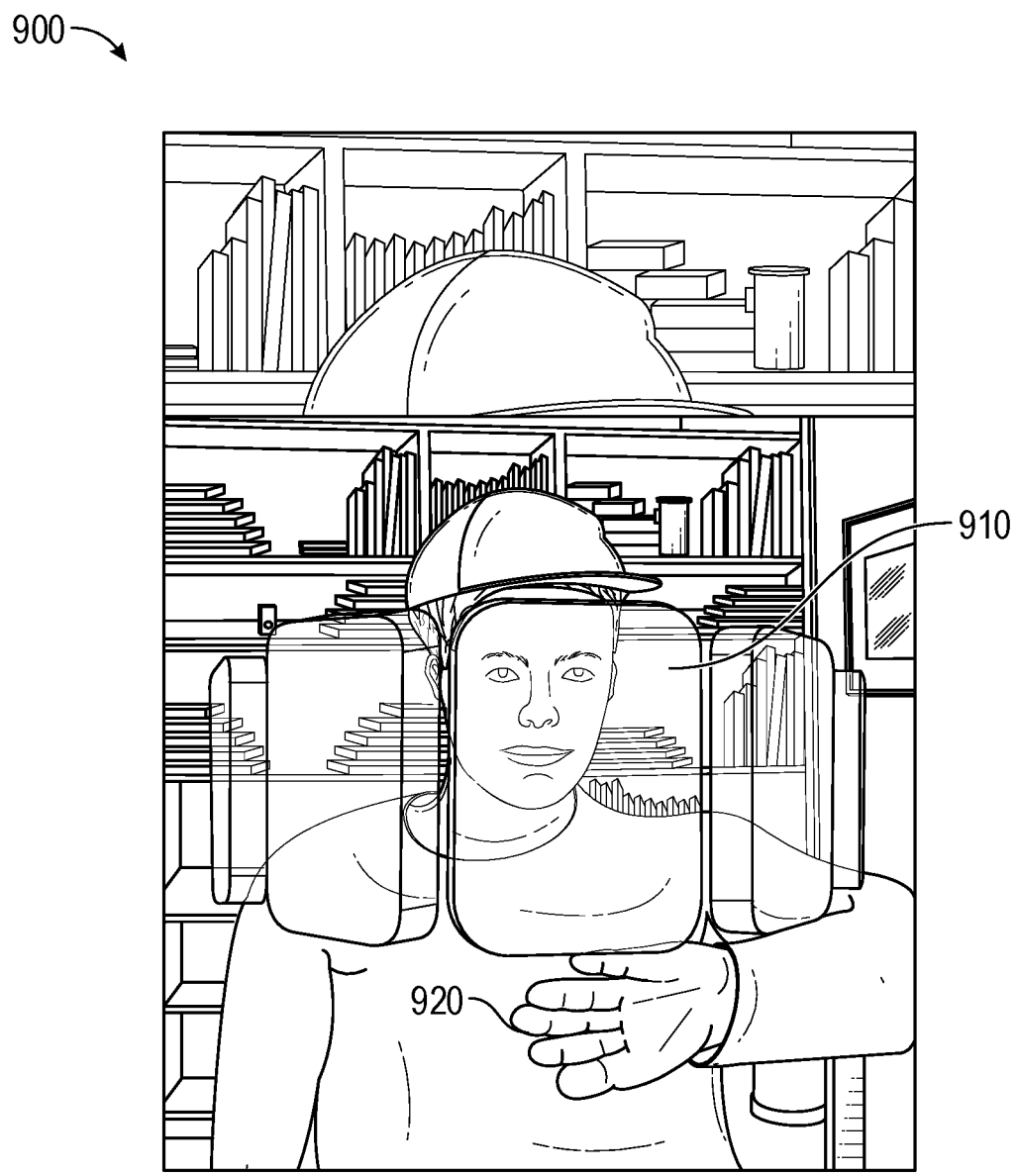

FIGS. 8A, 8B and 9 are illustrative screens of a graphical user interface of the hands-free control system 107 according to example examples. The screens shown in FIGS. 8A, 8B and 9 may be provided by the messaging client 104 of one or more client devices 102, the hands-free control system 107, other applications implemented on one or more client devices 102, the electronic mirroring device 130, the eyewear device 119, or any combination thereof.

For example, the screen 800 of FIG. 8A shows a screen 810 of an electronic mirroring device 130 in which a video feed of a user captured by the front-facing camera is shown. The hands-free control system 107 detects one or more fingers 812 of a user's hand in the video feed. In response, the hands-free control system 107 generates a virtual line 818 that extends from the one or more fingers 812 and runs parallel to the one or more fingers 812. The virtual line 818 can actually be displayed in the screen 800 or can be omitted from the display and used to perform the disclosed operations. The hands-free control system 107 modifies different portions of a video feed or activates different functions or menu options based on determining that a direction to which the one or more fingers are pointing intersect a corresponding bounding region of the video feed.

Specifically, the hands-free control system 107 can generate various virtual bounding regions (e.g., virtual bounding boxes, virtual bounding circles, virtual bounding squares, virtual bounding rectangles or any other suitable shape(s)). For example, the hands-free control system 107 can generate a first virtual bounding box 816 that corresponds to an upper left region of the video stream, a second virtual bounding box 826 that corresponds to an upper right region of the video stream, a third virtual bounding box that corresponds to a lower left region of the video stream, and a fourth virtual bounding box that corresponds to a lower right region of the video stream. The virtual bounding regions/boxes 816 and 826 can be of the same size or of different sizes.

In one example, the hands-free control system 107 determines that the virtual line 818 intersects one or more borders of the first bounding box 816. In response, the hands-free control system 107 activates a function associated with the bounding region. For example, the hands-free control system 107 can determine that the virtual line 818 extending from the one or more fingers intersects one or more or a threshold number (e.g., two or more) of segments of the first virtual bounding box 816. In response, the hands-free control system 107 activates a function corresponding to the first virtual bounding box 816. The function may include applying a filter 814 to only the portion of the video stream enclosed by the first virtual bounding box 816 (e.g., the upper left region of the video stream). In such cases, the hands-free control system 107 instructs the electronic mirroring device to apply the filter 814 (e.g., a red filter) to the upper left region of the video stream and prevent application of the filter to remaining portions of the video stream.

As shown in screen 820, the hands-free control system 107 can determine that the one or more fingers have been moved to point in a different direction. The hands-free control system 107 updates the virtual line and determines that the virtual line 828 corresponding to the different direction intersects one or more or the threshold number of segments of the second virtual bounding box 826. In response, the hands-free control system 107 activates a function corresponding to the second virtual bounding box 826. The function may include applying the filter 824 (e.g., the red filter) to only the portion of the video stream enclosed by the second virtual bounding box 826 (e.g., the upper right region of the video stream). In such cases, the hands-free control system 107 instructs the electronic mirroring device 130 to transition the filter 814 that was applied to the upper left region of the video stream to apply the filter 824 only to the upper right region of the video stream and prevent application of the filter 824 to remaining portions of the video stream.

In some cases, rather than applying a filter or different filters to different regions of a video stream, the hands-free control system 107 can activate or perform different functions based on which virtual bounding box 816 or 826 is being pointed to by the one or more fingers. For example, the hands-free control system 107 can determine that the virtual line 818 extending from the one or more fingers intersects one or more or a threshold number (e.g., two or more) of segments of the first virtual bounding box 816 (e.g., intersects a corner of the first virtual bounding box 816). In response, the hands-free control system 107 performs a first function associated with the first virtual bounding box 816, such as starts/stops/pauses playback of an audio or video stream. The hands-free control system 107 can determine that the one or more fingers have been moved to point in a different direction. The hands-free control system 107 updates the virtual line 828 and determines that the virtual line 828 corresponding to the different direction intersects one or more or the threshold number of segments of the second virtual bounding box 826. In response, the hands-free control system 107 performs a second function associated with the second virtual bounding box 826, such as capturing a video clip, accessing a communication interface, answering a phone call, placing a phone call, responding to a message, accessing one or more applications, or performing some other feature of the messaging client 104.

In some examples, as shown in screen 830, the hands-free control system 107 displays a menu tray or options region 834. The options region 834 includes a set of options for creating, editing and sharing video clips or images, such as by applying one or more filters or augmented reality elements. Other options besides those shown can also be provided, such as messaging options, media navigation options, video/image modification options, communication interface options, and so forth. The options region 834 that is shown in this example includes one or more filter options. The options regions 834 can include an undo video clip option, when selected, deletes the previously captured video clip or one or more segments of one or more previously captured video clips; a video clip generation option, when selected, triggers the capture and recording of a video clip based on the video feed received by the front-facing camera of a specified duration (e.g., 5 second video clip); and a share video clip option, when selected, causes a list of recipients to be presented to the user. The hands-free control system 107 receives a selection of one or more recipients from the user (e.g., based on a direction to which one or more fingers are pointing) and then sends the last captured video clip or video clip segments to the designated recipients.

The hands-free control system 107 detects one or more fingers 832 of a hand of the user in the video feed. The hands-free control system 107 determines that one or more fingers 832 are pointing in a particular direction. For example, the hands-free control system 107 generates a virtual line 838 that extends from the one or more fingers 832 and runs parallel to the one or more fingers 832. The hands-free control system 107 determines whether the virtual line 838 intersects a display position of a given one of the options in the options region 834. In response, the hands-free control system 107 increases a size of an icon 836 relative to other icons shown in the options region 834 to indicate which icon is being identified by the direction to which the one or more fingers 832 are pointing.

As the direction of the one or more fingers changes, the direction of virtual line 838 is updated and also changes to remain parallel to the one or more fingers 832. In response to determining that the virtual line 838 intersects a display position of a second menu option instead of the first menu option, the hands-free control system 107 animates the icon 836 corresponding to the first menu option to reduce the size of the icon 836 and animates a second icon corresponding to the second menu option to increase the size of the second icon relative to the icon 836. This indicates to the user that the direction of the finger has been identified as corresponding to the second menu option. The hands-free control system 107 determines that the identified menu option remains identified by the one or more fingers 832 (e.g., the hands-free control system 107 determines that the one or more fingers remain pointed at and in a direction that a virtual line 838 continues to intersect the display position of the identified menu option) for a threshold period of time (e.g., 3 seconds or more). In response, the hands-free control system 107 activates a function corresponding to the identified menu option (e.g., plays/pauses playback of music or video, activates a video clip capture function, overlays one or more filters on the video feed, captures an image, activates one or more augmented reality experiences or elements).

In some cases, selection of a particular menu option corresponding to the icon 836, causes another menu option to be displayed (e.g., a slider). The slider allows a user to change one or more attributes associated with the selected option. For example, the particular menu option can correspond to a video clip duration setting. In response to detecting that the finger points to the icon 836, the hands-free control system 107 displays a slider (e.g., underneath or adjacent to the icon 836) that allows the user to increase/decrease a duration of the video clip that is captured. The hands-free control system 107 tracks a position to which the user's finger is pointing and moves the slider based on that position (e.g., by tracking a direction of the virtual line 838 and where such a line intersects positions along the slider). In response to detecting that the user's hand performs a particular gesture (e.g., closes the hand to make a fist), the hands-free control system 107 sets the clip duration to the duration specified by the slider and removes the slider from the display. The hands-free control system 107 can determine that the user's finger points to another option (e.g., to start capturing a video clip). In response, the hands-free control system 107 begins capturing a video clip of a duration set by the slider.

The screen 801 of FIG. 8B shows a screen 840 of an electronic mirroring device 130 in which a video feed of a user captured by the front-facing camera is shown. The hands-free control system 107 detects one or more fingers of a user's hand in the video feed and allows the user to scroll through a list of options by performing different gestures with the one or more fingers. For example, the electronic mirroring device 130 can initially overlay a first filter 842 or display a first set of augmented reality elements, as shown in screen 840. When the hands-free control system 107 detects that a particular gesture was performed by the one or more fingers, the hands-free control system 107 instructs the electronic mirroring device 130 to activate partially or fully a second filter 852 or display a second set of augmented reality elements, as shown in screen 850. As another example, the hands-free control system 107 detects a trajectory along which the one or more fingers is moved and instructs the electronic mirroring device 130 to activate partially or fully a second filter 852 or display a second set of augmented reality elements based on the trajectory, as shown in screen 850.

As an example, the hands-free control system 107 can determine that the direction of the one or more fingers has been changed or moved by a threshold amount (e.g., more than 90 degrees) in a particular direction (e.g., towards the right side of the display). Specifically, the hands-free control system 107 can determine that the one or more fingers have been moved from pointing vertically up 854 to pointing horizontally to the right side 844. In response, the hands-free control system 107 scrolls through a menu of options from a first option 846 to a second option 847. Specifically, the electronic mirroring device 130 can currently have a function corresponding to a first menu option 846 activated (e.g., a first filter 842 or augmented reality experience is presently displayed). In response to determining that the one or more fingers have been moved from pointing vertically up 854 to pointing horizontally to a first side 844 (e.g., a right side of the display), the hands-free control system 107 scrolls the menu of options to the next adjacent menu option 847 (e.g., to access a function corresponding to a second menu option). In such cases, the electronic mirroring device activates the function corresponding to a second menu option 847 (e.g., a second filter 852 or augmented reality experience) and stops the function corresponding to the first menu option 846 from being activated. In another example, the second filter 852 can initially be presented by the electronic mirroring device 130. In response to determining that the one or more fingers have performed a given gesture (e.g., have been moved from pointing vertically up 854 to pointing horizontally to the right side 844 of the display), the hands-free control system 107 instructs the electronic mirroring device 130 to access the next adjacent menu option 847. This results in applying the first filter 842 to the video feed instead of the second filter 852.

As another example, the hands-free control system 107 can detect a second gesture performed by the one or more fingers. This second gesture may cause the hands-free control system 107 to navigate to a previous option 849 in the list of options that are displayed. For example, in response to determining that the one or more fingers have been moved from pointing vertically up 854 to pointing horizontally to a second side (which is opposite to the first side, such as the left side of the display), the hands-free control system 107 scrolls the menu of options to the previous adjacent menu option 849 (e.g., to access a function corresponding to a third menu option). Namely, if the function corresponding to the first menu option 846 is currently activated, the electronic mirroring device activates a function corresponding to a third menu option 849 that is previous to on the left hand side relative to the first menu option 846 (e.g., a third filter or augmented reality experience is activated) and stops the function corresponding to the first menu option 846 from being activated. The option that is displayed in the center and encircled by an indicator corresponds to the function or feature that is currently activated.

As an example, the hands-free control system 107 can determine that a trajectory of movement of the one or more fingers corresponds to a particular direction (e.g., towards the right side of the display). In response, the hands-free control system 107 scrolls through a menu of options from a first option 846 to a second option 847. As another example, the hands-free control system 107 can determine another trajectory of movement of the one or more fingers corresponds to a different direction (e.g., towards the left side of the display). In response, the hands-free control system 107 scrolls through a menu of options from a first option 846 to a third option 849 (e.g., a previous option).

In some implementations, the hands-free control system 107 determines that one or more fingers of the hand have been bent by a certain degree. In response, the hands-free control system 107 navigates through and scrolls partially through the set of options 868 and 869 based on the degree by which the one or more fingers have been bent. For example, as shown in screens 860 and 870, the hands-free control system 107 determines that the fingers have been bent by a first degree (e.g., are bent by 25 degrees from pointing in a direct vertical position 874 to pointing towards a left side). In response, the hands-free control system 107 causes a first amount of a first menu option 868 to be activated and a second amount of a second menu option 869 to be activated. For example, as shown in screen 860, a first amount 862 of a first filter is overlaid on a first portion of the video feed together (concurrently) with a second amount 864 of a second filter that is overlaid on a second portion of the video feed. In this case, part of a feature of one option 868 is activated together with part of a feature of another option 869. In another example, the first portion of the video feed (corresponding to the first amount 862) can display a first set of augmented reality elements corresponding to a first option 868 while a second portion of the video feed (corresponding to the second amount 864) displays a second set of augmented reality elements corresponding to a second option 869.

As the one or more fingers continue being bent by a second degree greater than the first degree (e.g., are bent by an additional 30 degrees from the direction pointing towards the left side, such that the one or more fingers are bent by 55 degrees from the initial direct vertical position 874 to pointing towards the left side), the hands-free control system 107 causes a third amount of a first menu option 868 to be activated and a fourth amount of a second menu option 869 to be activated. The third amount of the first menu option 868 may be greater than first amount of the first menu option 868 and the fourth amount of the second menu option 869 may be less than the second amount of the second menu option 869. Alternatively, the third amount of the first menu option 868 may be less than first amount of the first menu option 868 and the fourth amount of the second menu option 869 may be greater than the second amount of the second menu option 869. For example, as shown in screen 870, a third amount 872 of the first filter is overlaid on a third portion of the video feed together with a fourth amount 876 of the second filter that is overlaid on a fourth portion of the video feed. In this case, part of a feature of one option 868 is activated together with part of a feature of another option 869 (e.g., both options are within the center circular indicator that identifies which menu options are currently activated in the video feed). In another example, the third portion of the video feed (corresponding to the third amount 872) can display the first set of augmented reality elements corresponding to the first option 868 while a second portion of the video feed (corresponding to the fourth amount 876) displays a second set of augmented reality elements corresponding to a second option 869.

The hands-free control system 107 continuously animates and adjusts the amount of the first and second filters that are applied to the video feed respectively based on the degree by which the one or more fingers are bent. For example, as the one or more fingers continue to be bent, the hands-free control system 107 increases the portion of the video feed that is overlaid by the first filter and reduces the portion of the video feed that is overlaid by the second filter. In response to determining that the one or more fingers are moved from a bent position or configuration to an unbent position or configuration in which the fingers are extended, the hands-free control system 107 decreases the portion of the video feed that is overlaid by the first filter and increases the portion of the video feed that is overlaid by the second filter. As another example, as the one or more fingers continue to be bent, the hands-free control system 107 increases the portion of the video feed that is overlaid by the first set of augmented reality elements and reduces the portion of the video feed that is overlaid by the second augmented reality elements. In response to determining that the one or more fingers are moved from a bent position or configuration to an unbent position or configuration in which the fingers are extended, the hands-free control system 107 decreases the portion of the video feed that is overlaid by the first set of augmented reality elements and increases the portion of the video feed that is overlaid by the second set of augmented reality elements. This gives the user greater control in applying visual effects to a video stream.

FIG. 9 shows a screen 900 of an electronic mirroring device 130 in which a video feed of a user captured by the front-facing camera is shown together with a two-dimensional or three-dimensional carousel 910 of menu options. The hands-free control system 107 detects a hand 920 or fingers of the hand within the video stream and determines that the hand has been moved in a particular direction. For example, the hands-free control system 107 determines that the palm of the hand is pointing towards the right of the screen and that the hand has been moved towards the same direction (the right of the screen). In response, the hands-free control system 107 causes the carousel 910 of menu options to rotate or turn (e.g., clockwise) along the particular direction that the hand is moved within the video stream. The hands-free control system 107 can then determine that the hand has been moved in an opposite direction to the particular direction. For example, the hands-free control system 107 determines that the palm of the hand is pointing towards the left (or continues pointing towards the right) of the screen and that the hand has been moved towards the left direction (the left of the screen). The hands-free control system 107 causes the carousel 910 of menu options to rotate or turn along the opposite direction (e.g., to rotate counter-clockwise). As the carousel 910 turns or rotates, different functions or features corresponding to the options of the carousel 910 are activated. For example, the menu of options in the carousel 910 can represent different music tracks in a music album. As different options of the menu are displayed in the center (e.g., in front of the user's face), the music tracks corresponding to those options are played back. In this way, as the user moves the hand in one direction, the carousel 910 rotates and plays back different music tracks from the music album. In other examples, the menu of options in the carousel 910 can represent different augmented reality experiences or filters. As different options of the menu are displayed in the center (e.g., in front of the user's face), the augmented reality experiences or filters corresponding to those options are activated and overlaid on the video stream that is displayed with the carousel 910. In this way, as the user moves the hand in one direction, the carousel 910 rotates and activates different augmented reality experiences or filters.

Machine Architecture

Figure 10:
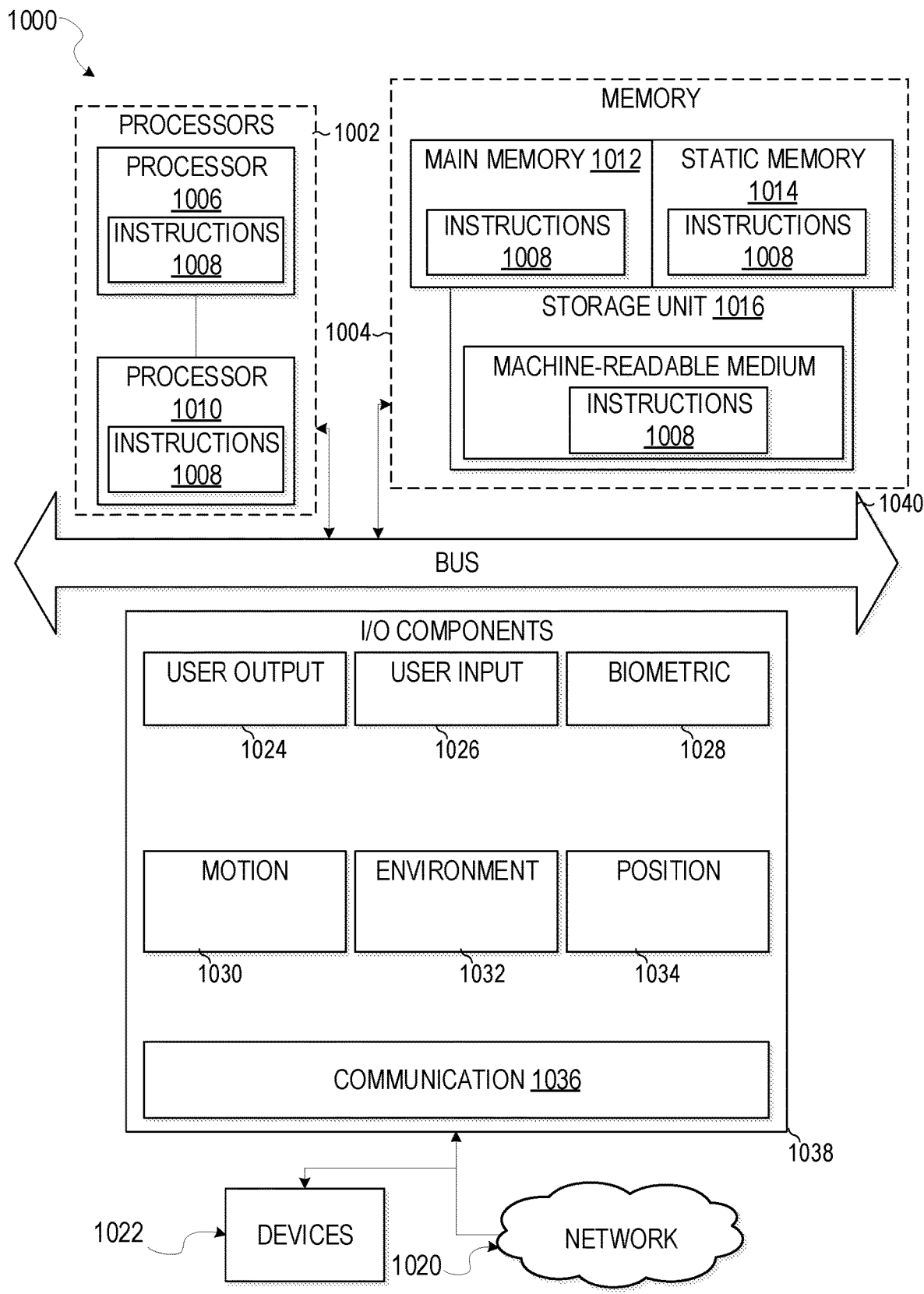
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of the machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein. The machine 1000, for example, may comprise the client device 102 or any one of a number of server devices forming part of the messaging server system 108. In some examples, the machine 1000 may also comprise both client and server systems, with certain operations of a particular method or algorithm being performed on the server-side and with certain operations of the particular method or algorithm being performed on the client-side.

The machine 1000 may include processors 1002, memory 1004, and input/output (I/O) components 1038, which may be configured to communicate with each other via a bus 1040. In an example, the processors 1002 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single-core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, all accessible to the processors 1002 via the bus 1040. The main memory 1004, the static memory 1014, and the storage unit 1016 store the instructions 1008 embodying any one or more of the methodologies or functions described herein. The instructions 1008 may also reside, completely or partially, within the main memory 1012, within the static memory 1014, within machine-readable medium 1018 within the storage unit 1016, within at least one of the processors 1002 (e.g., within the processor's cache memory), or any suitable combination thereof, during execution thereof by the machine 1000.

The I/O components 1038 may include a wide variety of components to receive input, provide output, produce output, transmit information, exchange information, capture measurements, and so on. The specific I/O components 1038 that are included in a particular machine will depend on the type of machine. For example, portable machines such as mobile phones may include a touch input device or other such input mechanisms, while a headless server machine will likely not include such a touch input device. It will be appreciated that the I/O components 1038 may include many other components that are not shown in FIG. 10. In various examples, the I/O components 1038 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1038 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 include acceleration sensor components (e.g., accelerometer), gravitation sensor components, rotation sensor components (e.g., gyroscope).

The environmental components 1032 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1038 further include communication components 1036 operable to couple the machine 1000 to a network 1020 or devices 1022 via respective coupling or connections. For example, the communication components 1036 may include a network interface component or another suitable device to interface with the network 1020. In further examples, the communication components 1036 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1022 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1012, static memory 1014, and memory of the processors 1002) and storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed examples.

The instructions 1008 may be transmitted or received over the network 1020, using a transmission medium, via a network interface device (e.g., a network interface component included in the communication components 1036) and using any one of several well-known transfer protocols (e.g., hypertext transfer protocol (HTTP)). Similarly, the instructions 1008 may be transmitted or received using a transmission medium via a coupling (e.g., a peer-to-peer coupling) to the devices 1022.

Software Architecture

Figure 11:
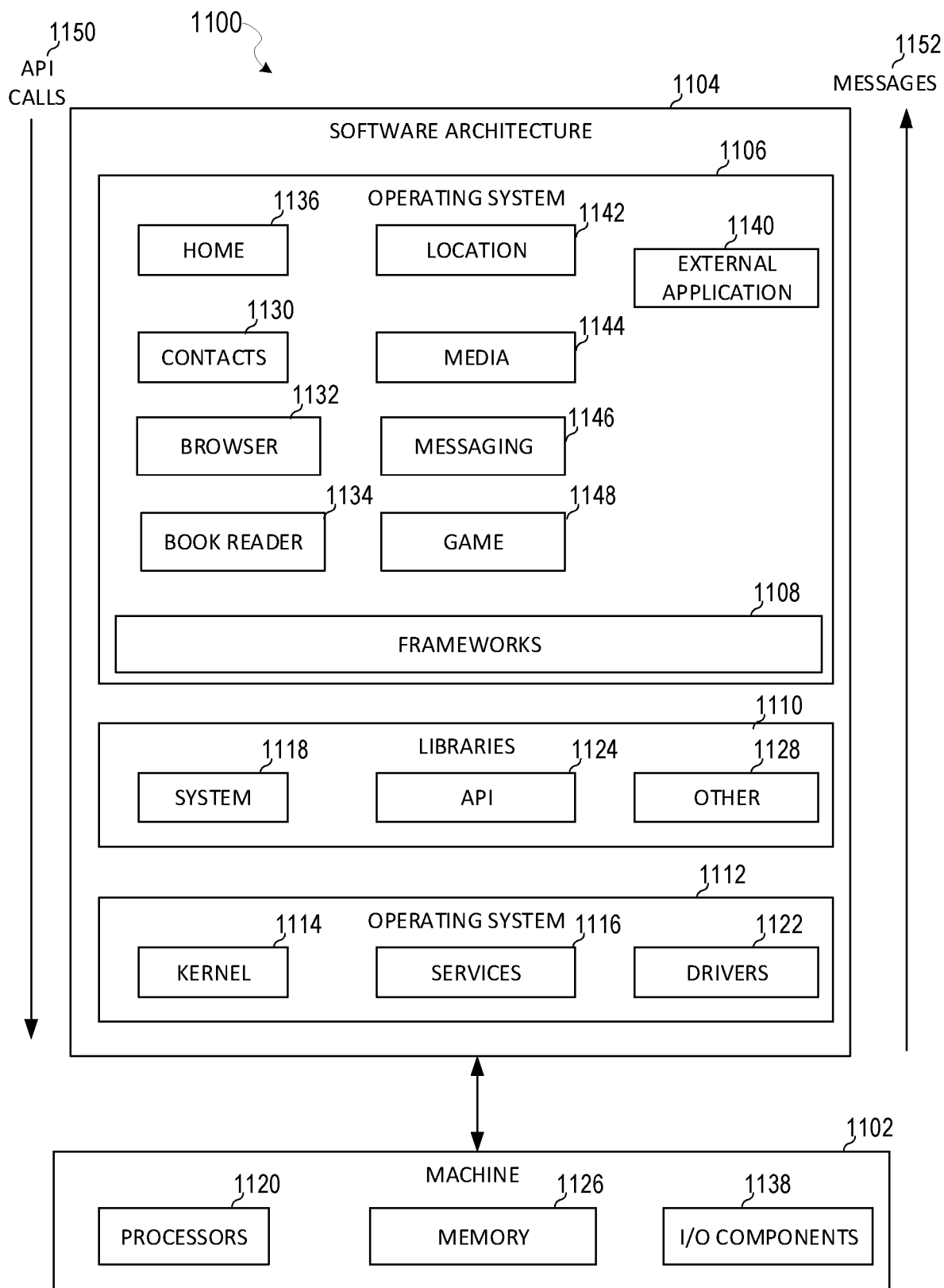
FIG. 11 is a block diagram showing a software architecture within which examples may be implemented.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionality. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1110 provide a common low-level infrastructure used by the applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a common high-level infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In an example, the applications 1106 may include a home application 1136, a contacts application 1130, a browser application 1132, a book reader application 1134, a location application 1142, a media application 1144, a messaging application 1146, a game application 1148, and a broad assortment of other applications such as a external application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the external application 1140 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the external application 1140 can invoke the API calls 1150 provided by the operating system 1112 to facilitate functionality described herein.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), World-wide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example examples, the processors or processor-implemented components may be located in a single geographic location (e.g., within a home environment, an office environment, or a server farm). In other example examples, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code,", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed examples without departing from the scope of the present disclosure. These and other changes or modifications are intended to be included within the scope of the present disclosure, as expressed in the following claims.

Modules, Components, and Logic

Certain examples are described herein as including logic or a number of components, modules, or mechanisms. Modules can constitute either software modules (e.g., code embodied on a machine-readable medium or in a transmission signal) or hardware modules. A "hardware module" is a tangible unit capable of performing certain operations and can be configured or arranged in a certain physical manner. In various example examples, one or more computer systems (e.g., a standalone computer system, a client computer system, or a server computer system) or one or more hardware modules of a computer system (e.g., a processor or group of processors) is configured by software (e.g., an application or application portion) as a hardware module that operates to perform certain operations as described herein.

In some examples, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application-Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering examples in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In examples in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example examples, the processors or processor-implemented modules are located in a single geographic location (e.g., within a home environment, an office environment, or a server farm). In other example examples, the processors or processor-implemented modules are distributed across a number of geographic locations.

What is claimed is:

1. A method comprising:
   capturing, by an electronic mirroring device, a video feed received from a camera of the electronic mirroring device, the video feed depicting a user;
   identifying a finger of a hand of the user in the video feed;
   determining a direction within the video feed to which the finger is pointing;
   determining that a virtual line, corresponding to the direction, intersects a first corner region of the video feed; and
   in response to determining that the virtual line intersects the first virtual corner, activating a first menu option.

2. The method of claim 1, further comprising:
   displaying one or more menu options on the video feed that depicts the user, wherein accessing the first menu option comprises selecting the first menu option from the one or more menu options that are displayed.

3. The method of claim 2, further comprising:
   generating a virtual line that extends from a point on the finger and is parallel to the finger;
   determining that the virtual line intersects a display position of at least a portion of the first menu option; and
   in response to determining that the virtual line intersects the display position of at least the portion of the first menu option, accessing the first menu option.

4. The method of claim 3, further comprising visually distinguishing the first menu option from other options of the one or more menu options as a result of accessing the first menu option.

5. The method of claim 3, further comprising:
   detecting movement of the finger within the video feed;
   updating the virtual line based on detecting movement of the finger; and
   determining that the updated virtual line intersects a display position of at least a portion of a second menu option of the one or more menu options.

6. The method of claim 5, further comprising:
   in response to determining that the virtual line intersects the display position of at least the portion of the second menu option, accessing the second menu option; and
   visually distinguishing the second menu option instead of the first menu option as a result of accessing the second menu option after accessing the first menu option.

7. The method of claim 1, further comprising:
   generating a virtual line that extends from a point on the finger and is parallel to the finger;
   determining that the virtual line intersects a first virtual bounding region of the video feed; and
   in response to determining that the virtual line intersects the first virtual bounding region, activating the first menu option.

8. The method of claim 7, further comprising:
   detecting movement of the finger within the video feed;
   updating the virtual line based on detecting movement of the finger;

determining that the updated virtual line intersects a second virtual bounding region of the video feed; and in response to determining that the virtual line intersects the second virtual bounding region, activating a second menu option.

9. The method of claim 8, wherein:

activating the first menu option comprises applying a first filter only to a first portion of the video feed bounded by the first virtual bounding region; and activating the second menu option comprises applying the first filter only to a second portion of the video feed bounded by the second virtual bounding region.

10. The method of claim 1, further comprising:

accessing the first menu option, displayed within the first corner region, based on the direction within the video feed to which the finger is pointing.

11. The method of claim 1, further comprising:

determining movement of the finger within the video feed;

in response to determining that the finger has been moved, determining a trajectory of the movement of the finger; and accessing a second menu option based on the trajectory of the movement of the finger.

12. The method of claim 11, further comprising animating a transition from accessing the first menu option to accessing the second menu option based on a degree of the movement of the finger.

13. The method of claim 12, wherein animating the transition comprises:

applying a first visual effect associated with the first menu option to a first display region of the video feed concurrently with applying a second visual effect associated with the second menu option to a second display region of the video feed, wherein a size of the first display region to which the first visual effect is applied relative to a size of the second display region to which the second visual effect is applied is determined based on the degree of the movement of the finger.

14. The method of claim 1, wherein the electronic mirroring device comprises a stationary device in which a size of a display has a height that is greater than a height of the user, and wherein the camera is a front-facing camera that is on a same side as the display of the electronic mirroring device.

15. The method of claim 1, wherein the electronic mirroring device comprises a mobile device fixed on a camera stand, and wherein the camera is a front-facing camera that is on a same side as a display of the electronic mirroring device.

16. The method of claim 1, wherein the electronic mirroring device comprises an eyewear device through which a user views a static mirror.

17. The method of claim 1, further comprising:

displaying a three-dimensional carousel of menu options; and turning the three-dimensional carousel based on detecting movement of the hand within the video feed.

18. The method of claim 17, wherein a direction in which the three-dimensional carousel is turned corresponds to a direction of the detected movement of the hand.

19. A system comprising:

a processor of an electronic mirroring device configured to perform operations comprising:

capturing, by the electronic mirroring device, a video feed received from a camera of the electronic mirroring device, the video feed depicting a user;

identifying a finger of a hand of the user in the video feed;

determining a direction within the video feed to which the finger is pointing;

determining that a virtual line, corresponding to the direction, intersects a first corner region of the video feed; and in response to determining that the virtual line intersects the first virtual corner, activating a first menu option.

20. A non-transitory machine-readable storage medium comprising instructions that, when executed by one or more processors of a machine, cause the machine to perform operations comprising:

capturing, by an electronic mirroring device, a video feed received from a camera of the electronic mirroring device, the video feed depicting a user;

identifying a finger of a hand of the user in the video feed;

determining a direction within the video feed to which the finger is pointing;

determining that a virtual line, corresponding to the direction, intersects a first corner region of the video feed; and in response to determining that the virtual line intersects the first virtual corner, activating a first menu option.

* * * * *

UNITED STATES PATENT AND TRADEMARK OFFICE
CERTIFICATE OF CORRECTION

| | | |
|---|---|---|
| PATENT NO. | : 11,809,633 B2 | Page 1 of 1 |
| APPLICATION NO. | : 17/249857 | |
| DATED | : November 7, 2023 | |
| INVENTOR(S) | : Eirinberg et al. | |

It is certified that error appears in the above-identified patent and that said Letters Patent is hereby corrected as shown below:

On the Title Page

On page 3, in Column 2, item (56) under "U.S. Patent Documents", Line 9, delete "2017/0035191" and insert --2017/0351910-- therefor Signed and Sealed this
Fourth Day of February, 2025

Coke Morgan Stewart
*Acting Director of the United States Patent and Trademark Office*